(12) United States Patent
Yang et al.

(10) Patent No.: US 8,593,427 B1
(45) Date of Patent: Nov. 26, 2013

(54) SYSTEM AND METHOD FOR MANAGING DISPLAY POWER CONSUMPTION

(71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

( * ) Notice: Subject to any disclaimer, the term of this patent is extended or adjusted under 35 U.S.C. 154(b) by 0 days.

(21) Appl. No.: 13/905,064

(22) Filed: May 29, 2013

Related U.S. Application Data

(60) Provisional application No. 61/822,267, filed on May 10, 2013.

(51) Int. Cl.
*G06F 3/041* (2006.01)

(52) U.S. Cl.
USPC ........... 345/173; 345/168; 345/169; 345/184; 715/764; 715/780; 178/18.01; 178/18.06

(58) Field of Classification Search
USPC ............... 345/173, 168, 169, 184; 178/18.01, 178/18.06; 715/800, 764, 780
See application file for complete search history.

(56) References Cited

U.S. PATENT DOCUMENTS

| | | | | |
|---|---|---|---|---|
| 4,952,932 A * | 8/1990 | Sugino et al. | .................. | 341/23 |
| 8,217,904 B2 * | 7/2012 | Kim | ............................. | 345/173 |
| 8,281,252 B2 * | 10/2012 | Kapanen et al. | ............ | 715/777 |
| 8,432,369 B2 * | 4/2013 | Katsu et al. | .................... | 345/173 |
| 2002/0198906 A1 * | 12/2002 | Press | ............................. | 707/503 |
| 2005/0005249 A1 * | 1/2005 | Hill et al. | ...................... | 715/963 |
| 2005/0195217 A1 * | 9/2005 | Robertson et al. | ............ | 345/619 |
| 2007/0252822 A1 * | 11/2007 | Kim et al. | ..................... | 345/173 |
| 2008/0158189 A1 * | 7/2008 | Kim | ................ | 345/173 |
| 2008/0189645 A1 * | 8/2008 | Kapanen et al. | ............. | 715/777 |
| 2009/0119589 A1 * | 5/2009 | Rowell et al. | .................... | 715/716 |
| 2009/0256814 A1 * | 10/2009 | Chung et al. | .................. | 345/173 |
| 2010/0088634 A1 * | 4/2010 | Tsuruta et al. | ............... | 715/800 |
| 2010/0138767 A1 * | 6/2010 | Wang et al. | .................. | 715/769 |
| 2010/0315371 A1 * | 12/2010 | Katsu et al. | .................... | 345/173 |
| 2012/0054674 A1 * | 3/2012 | Beykpour et al. | ............ | 715/788 |
| 2012/0117507 A1 * | 5/2012 | Tseng et al. | .................. | 715/774 |
| 2012/0131497 A1 * | 5/2012 | Jitkoff | ............................ | 715/786 |
| 2013/0080960 A1 * | 3/2013 | McRae et al. | ................. | 715/772 |

* cited by examiner

*Primary Examiner* — Lun-Yi Lao
*Assistant Examiner* — Priyank Shah
(74) *Attorney, Agent, or Firm* — Stephen A. Mason; Meyertons, Hood, Kivlin, Kowert & Goetzel, P.C.

(57) ABSTRACT

Systems and methods for managing display power consumption are disclosed. In some embodiments first information is displayed in an available display area including a first portion of a display screen in a configuration having a set of portions. The set of portions includes the first portion of the display screen, which is configured in a powered-on state to perform display functions and receive user input, and a second portion of the display screen, which is configured in a powered-off state. Responsive to a user indication in the in the first portion, the second portion is added to the available display area by transitioning the second portion to the powered-on state to perform display functions and receive user input. Second information is displayed in the second portion.

17 Claims, 33 Drawing Sheets ical Field

This disclosure relates generally to power management, and, more specifically, to managing power consumption in display systems.

2. Description of the Related Art

The revolution in mobile computing devices, also described herein as multifunction devices, has progressed a far greater pace than the progress of the batteries that power mobile devices. From smart phones to tablets to laptops, users face increasing frustration as batteries drain under the ceaseless consumption produced by modern display devices.

As the multifunction devices improve and provide an increasingly sophisticated array of functions to the user, demand for power increases on two fronts. First, the amount of time that devices are in use increases. Second, improved hardware such as brighter display screens and faster processors drains more battery power for each minute that the multifunction device remains in use.

SUMMARY OF EMBODIMENTS

Systems and methods for managing display power consumption are disclosed. In some embodiments first information is displayed in an available display area including a first portion of a display screen in a configuration having a set of portions. The set of portions includes the first portion of the display screen, which is configured in a powered-on state to perform display functions and receive user input, and a second portion of the display screen, which is configured in a powered-off state. Responsive to a user indication in the in the first portion, the second portion is added to the available display area by transitioning the second portion to the powered-on state to perform display functions and receive user input. Second information is displayed in the second portion.

Figure 1:
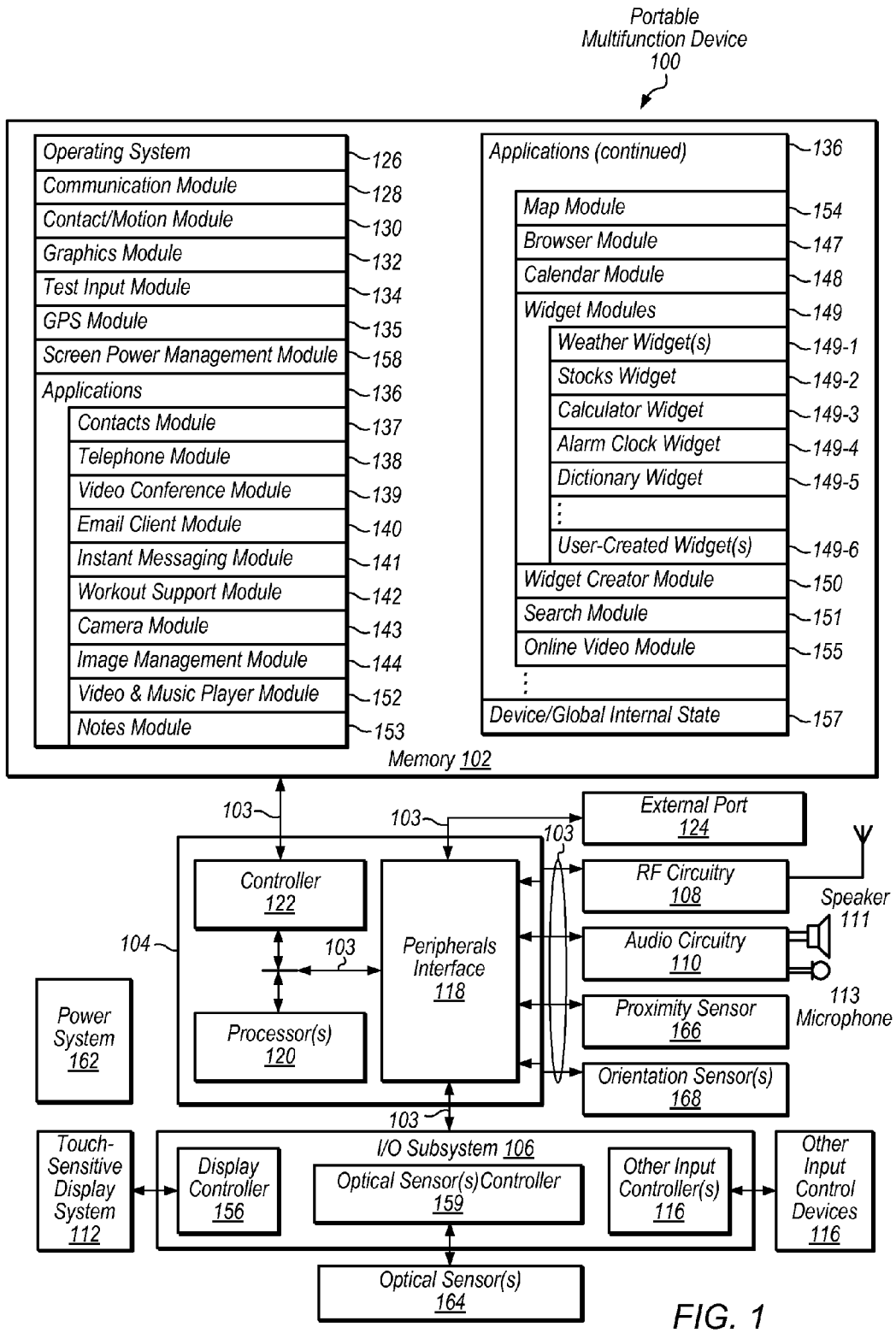
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for managing display power consumption are disclosed. In some embodiments first information is displayed in an available display area including a first portion of a display screen in a configuration having a plurality of portions. In some embodiments, the display screen includes the first portion of the display screen, which is configured in a powered-on state to perform display functions and receive user input, and a second portion of the display screen, which is configured in a powered-off state. Responsive to a user indication in the in the first portion, the second portion is added to the available display area by transitioning the second portion to the powered-on state to perform display functions and receive user input. Second information is displayed in the second portion.

The process is reversible, and a portion of the display screen may be removed from the powered-on state to the powered off state in response to user input. Likewise, the actions described herein as being performed in response to user input may, in some embodiments, be performed in response to system events such as the passage of an amount of time or a signal from an application or system module, or other system events, such as a power-down or sleep signal.

Some embodiments include a redesign of the current user interface of smart phones and hand-held terminals, variously referred to herein as multifunction devices, giving the user the full freedom to touch change their screen and divide it into an active (working) portion and a non-active (non-working, dead) portion depending on their needs and application. Some embodiments achieve numerous valuable benefits such as extending existing battery usage time as a result of the unused electricity saved by the dead portion of the screen, and at the same time using the dead portion of the screen as a grip surface to securely and conveniently use applications such as the camera, etc.

Some embodiments present a new simple yet revolutionary user interface (UI) based on a concept and method which will elevate the user's freedom and flexibility and thus change the way smart phone and hand-held terminal users interact with their screen.

In some embodiments, the second information is generated by mathematically upscaling the first information. The second information includes a portion of the first information upscaled for display in both the second portion and the first portion. In some embodiments, third information in the first portion. The third information comprises a portion of the first information upscaled for display in both the second portion and the first portion. In some embodiments, a graphical content data structure including content for display in the available display area is received, and elements of the graphical content data structure are selected for display in the available display area based at least in part on whether the second portion is in a powered-on state.

In some embodiments, a graphical content data structure including content for display in the available display area is received, and elements of the graphical content data structure are scaled for display in the available display area based at least in part on a dimension of the available display area. In some embodiments, a graphical content data structure including content for display in the available display area is received, and elements of the graphical content data structure are scaled for display in the available display area based at least in part on whether the second portion is in a powered-on state.

In some embodiments, a graphical content data structure including content for display in the available display area is received, and a position relative to a background element of a foreground content element of the graphical content data structure is adjusted for display in the available display area based at least in part on whether the second portion is in a powered-on state. In some embodiments, a graphical content data structure including content for display in the available display area is received, and elements of the graphical content data structure are selected for display in the available display area based at least in part on a dimension of the available display area.

Some embodiments may include a means for managing display power consumption. For example, a screen power management module may display first information in an available display area comprising a first portion of a display screen in a configuration having a plurality of portions, responsive to a user indication in the in the first portion, add the second portion to the available display area by transitioning the second portion to the powered-on state to perform display functions and receive user input, and display second information in the second portion, as described herein. The screen power management module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to display first information in an available display area comprising a first portion of a display screen in a configuration having a plurality of portions, responsive to a user indication in the in the first portion, add the second portion to the available display area by transitioning the second portion to the powered-on state to perform display functions and receive user input, and display second information in the second portion, as described herein. Other embodiments of an screen power management module may be at least partially implemented by hardware circuitry and/or firmware stored, for example, in a non-volatile memory.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, screen power management module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video module and a music module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, screen power management module 158 controls portions of a screen active for display use as described herein, by controlling or causing the graphics module 132 to display first information in an available display area comprising a first portion of a display screen in a configuration having a plurality of portions, responsive to a user indication in the in the first portion, add the second portion to the available display area by transitioning the second portion to the powered-on state to perform display functions and receive user input, and display second information in the second portion, as described herein In conjunction with RF circuitry 108, audio circuitry 110, speaker 111, microphone 113, touch screen 112, display controller 156, optical sensor 164, screen power management module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
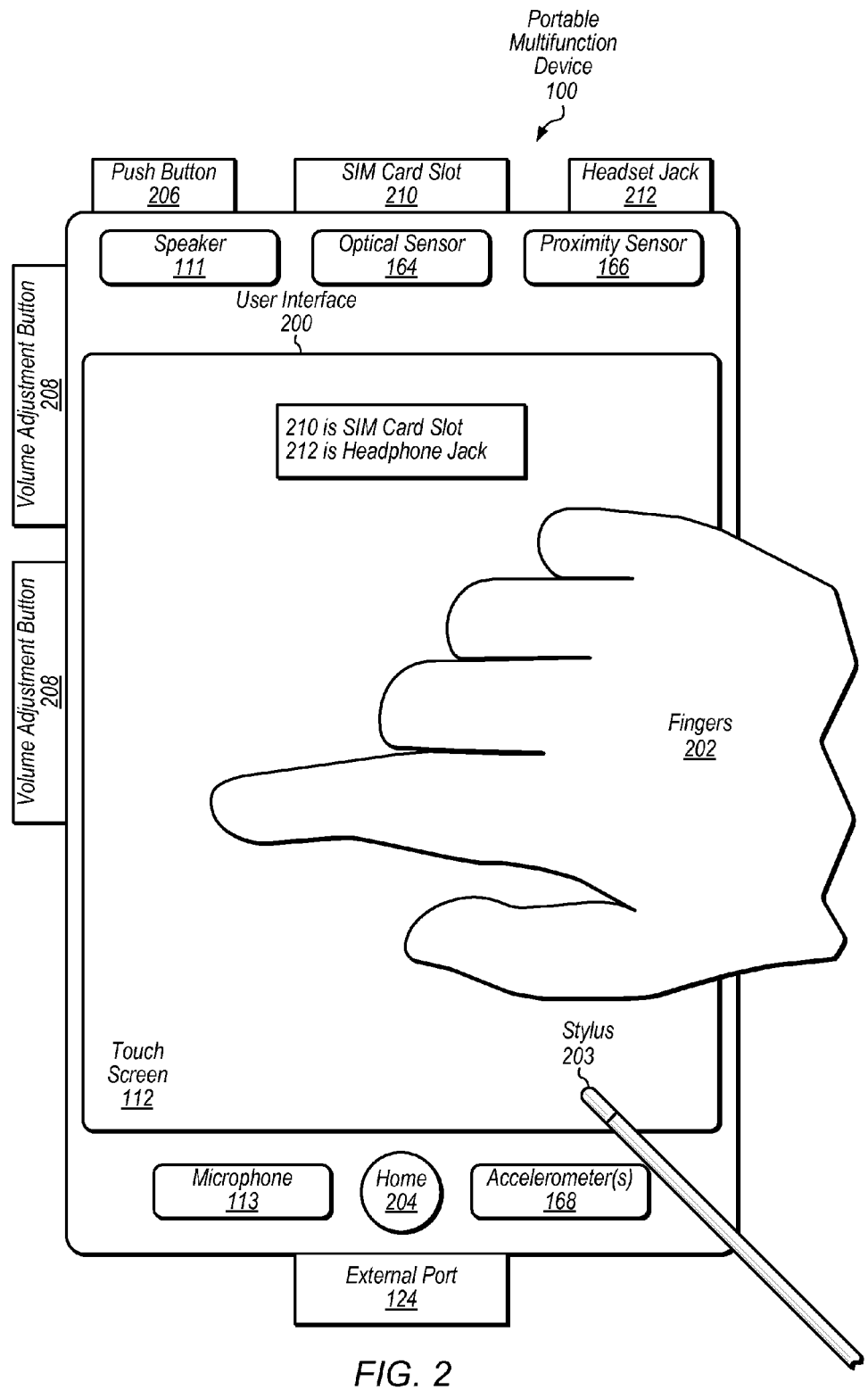
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

User Interface Examples

Figure 3:
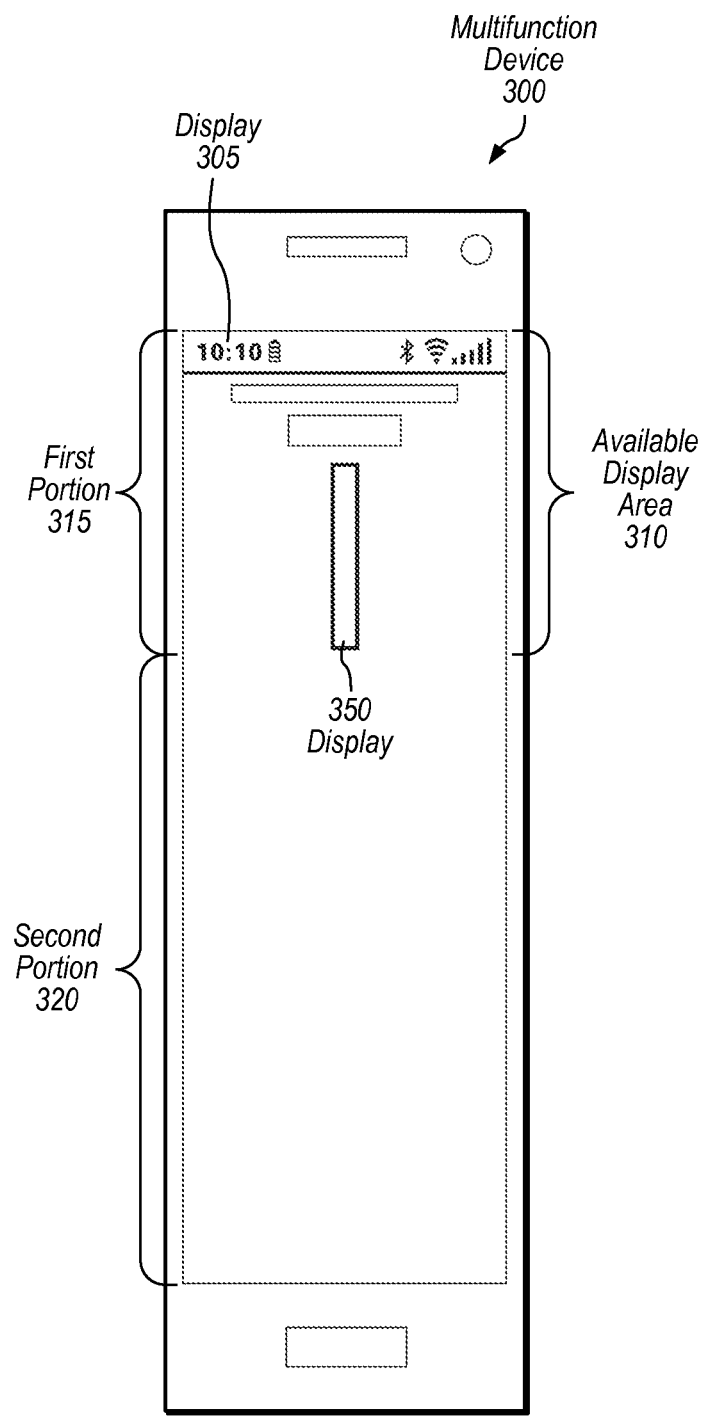
FIG. 3 illustrates a portable multifunction displaying first information in an available display area comprising a first portion of a display screen device in accordance with some embodiments.

FIG. 3 illustrates a portable multifunction displaying first information in an available display area comprising a first portion of a display screen device in accordance with some embodiments. Multifunction device 300 includes a display 305. A first portion 315 is an available display area 310 and a second portion 320 is in a powered-off condition. As shown in FIG. 3, multifunction device 300 is displaying first information in the available display area 310 comprising the first portion 315 of the display screen in a configuration having a plurality of portions, e.g., first portion 315 and second portion 320. The first portion 315 of the display screen 305 is configured in a powered-on state to perform display functions and receive user input. The second portion 320 is configured in a powered-off state. A display control bar 350 for providing user input is shown.

Figure 4:
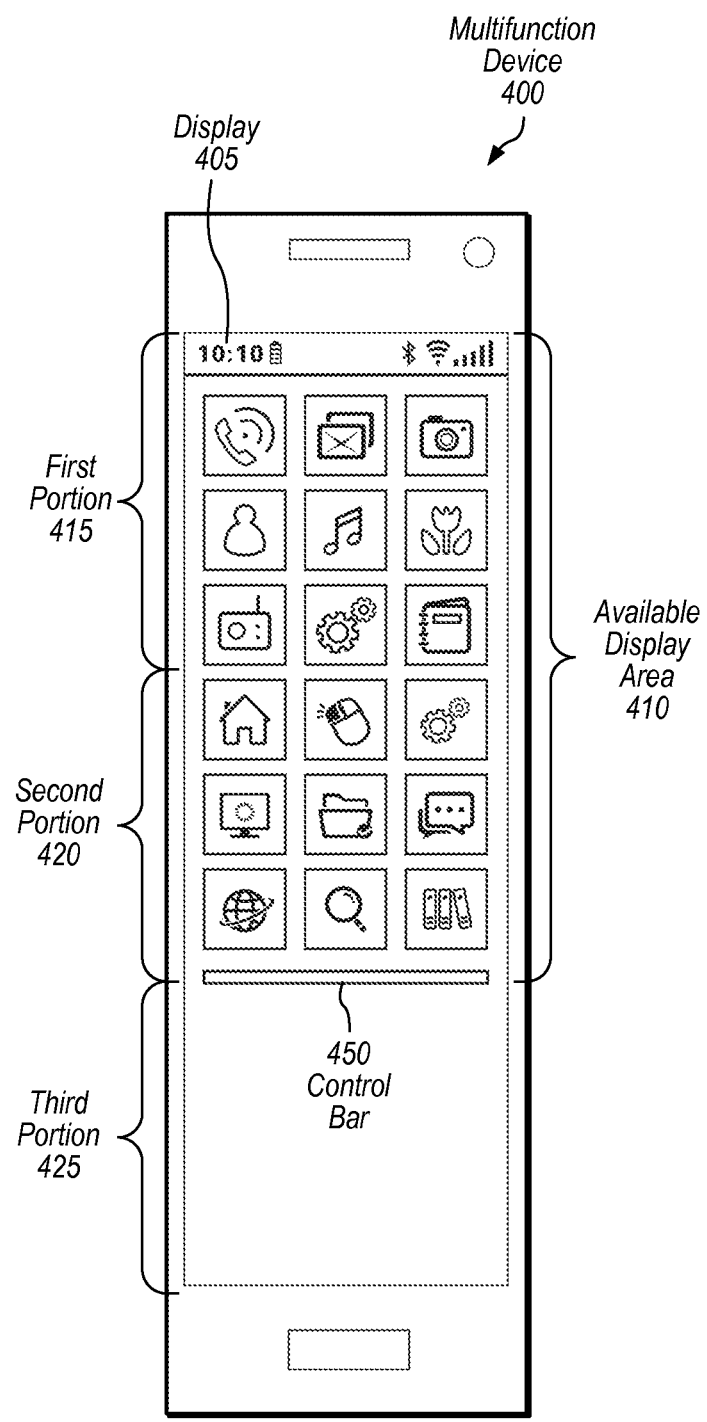
FIG. 4 depicts a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 4 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 400 includes a display 405. An available display area 410 includes a first portion 415 and a second portion 420. Note that a third portion 425 remains in a powered-off condition.

To achieve a transition from the state represented in FIG. 3 to the state represented in FIG. 4, multifunction device 400, responsive to a user indication, for instance movement of control bar 450, in the in the first portion 415, adds the second portion 420 to the available display area 410 by transitioning the second portion 415 to the powered-on state to perform display functions and receive user input, and displays second information in the second portion 420. User input can be provided by a dragging gesture while touching the location of display control bar 450, either to provide user input to expand the available display area 410 by transitioning the third portion 415 to the powered-on state to perform display functions and receive user input or to provide user input to contract the available display area 410 by transitioning the second portion 415 to the powered-off state.

Figure 5:
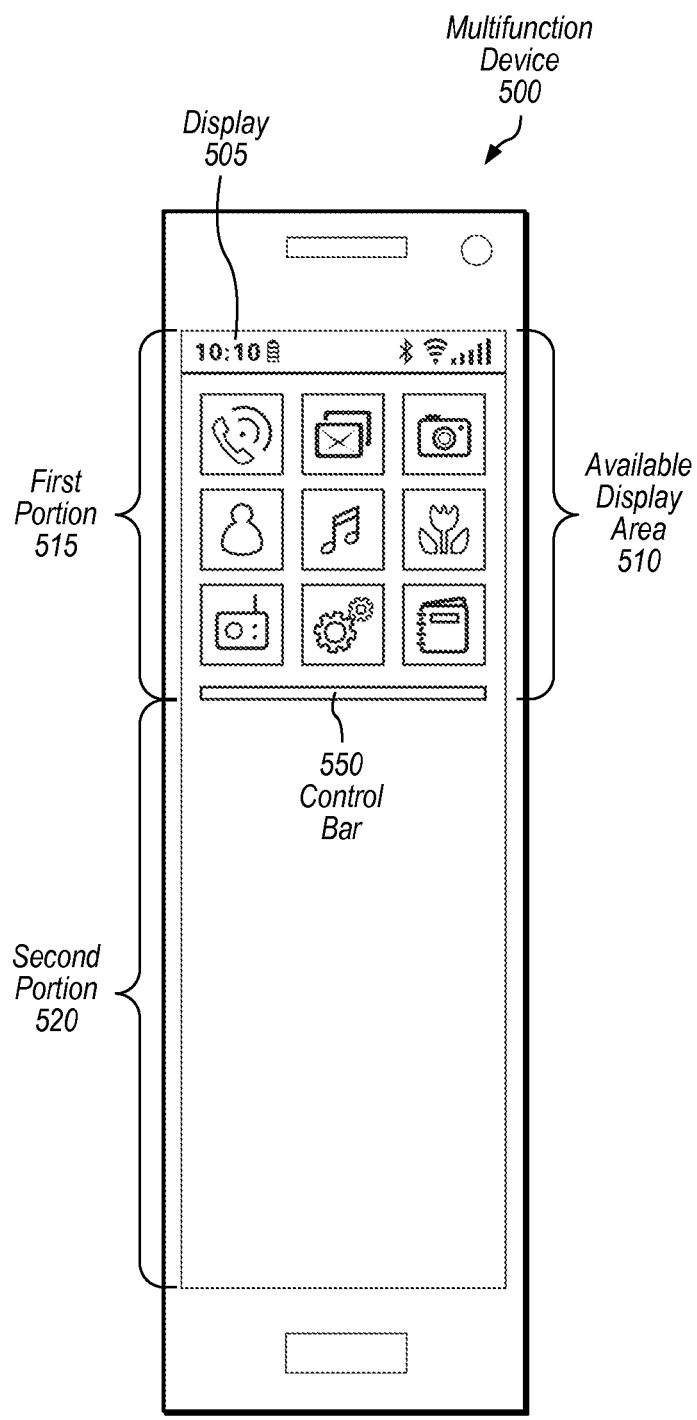
FIG. 5 illustrates a portable multifunction displaying first information in an available display area comprising a first portion of a display screen device in accordance with some embodiments.

FIG. 5 illustrates a portable multifunction displaying first information in an available display area comprising a first portion of a display screen device in accordance with some embodiments. Multifunction device 500 includes a display 505. A first portion 515 is an available display area 510 and a second portion 520 is in a powered-off condition. As shown in FIG. 5, multifunction device 500 is displaying first information in the available display area 510 comprising the first portion 515 of the display screen in a configuration having a plurality of portions, e.g., first portion 5315 and second portion 520. The first portion 515 of the display screen 505 is configured in a powered-on state to perform display functions and receive user input. The second portion 520 is configured in a powered-off state. A display control bar 550 for providing user input is shown.

To achieve a transition from the state represented in FIG. 4 to the state represented in FIG. 5, multifunction device 500, responsive to a user indication, for instance movement of control bar 550, in the second portion 520, transitions the second portion 520 to the powered-off state to perform display functions. User input can be provided by a dragging gesture while touching the location of display control bar 550, to provide user input to expand the available display area 510 by transitioning the second portion 520 to the powered-on state to perform display functions and receive user input.

Figure 6:
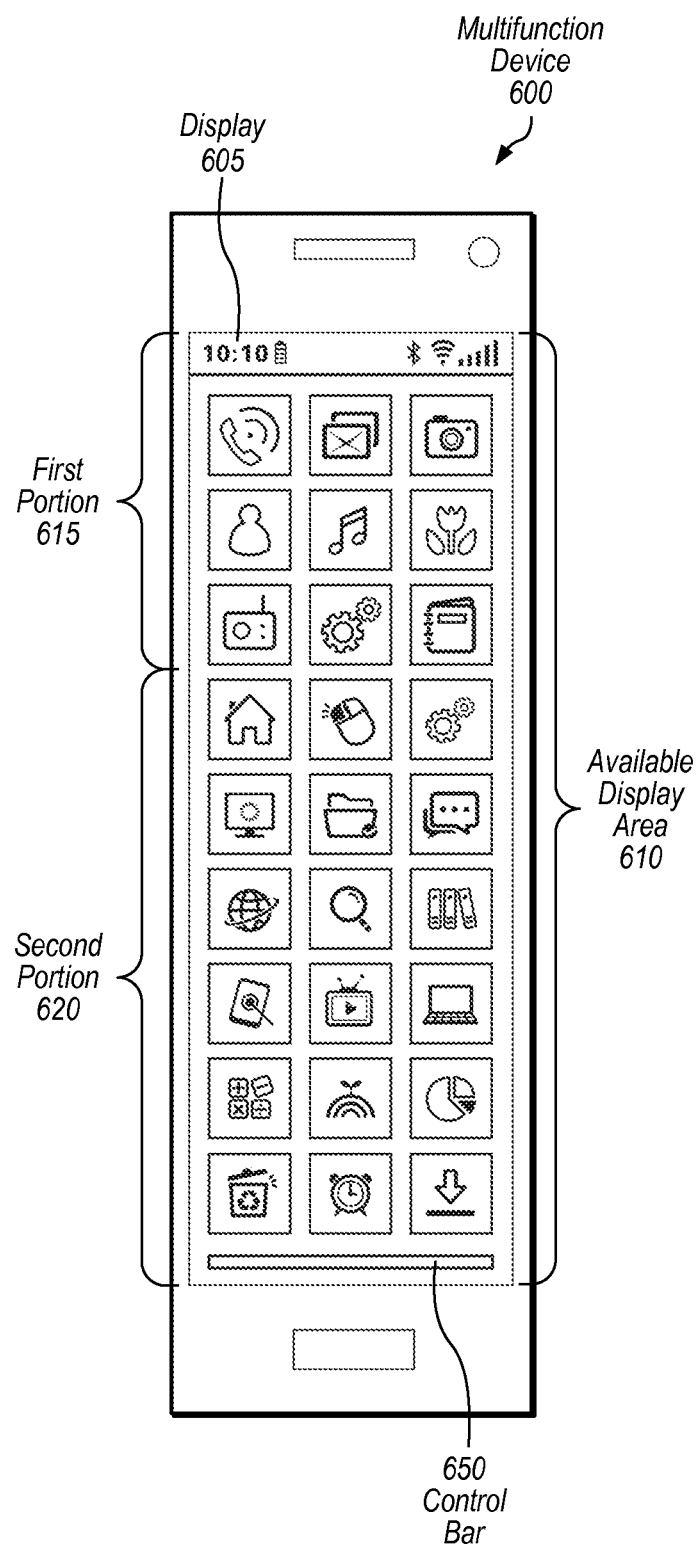
FIG. 6 depicts a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 6 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 600 includes a display 605. An available display area 610 includes a first portion 615 and a second portion 620.

To achieve a transition from the state represented in FIG. 3 to the state represented in FIG. 5, multifunction device 600, responsive to a user indication, for instance movement of control bar 650, in the in the first portion 615, adds the second portion 620 to the available display area 610 by transitioning the second portion 415 to the powered-on state to perform display functions and receive user input, and displays second information in the second portion 620. User input can be provided by a dragging gesture while touching the location of display control bar 650, to provide user input to contract the available display area 610 by transitioning the second portion 620 to the powered-off state.

Figure 7:
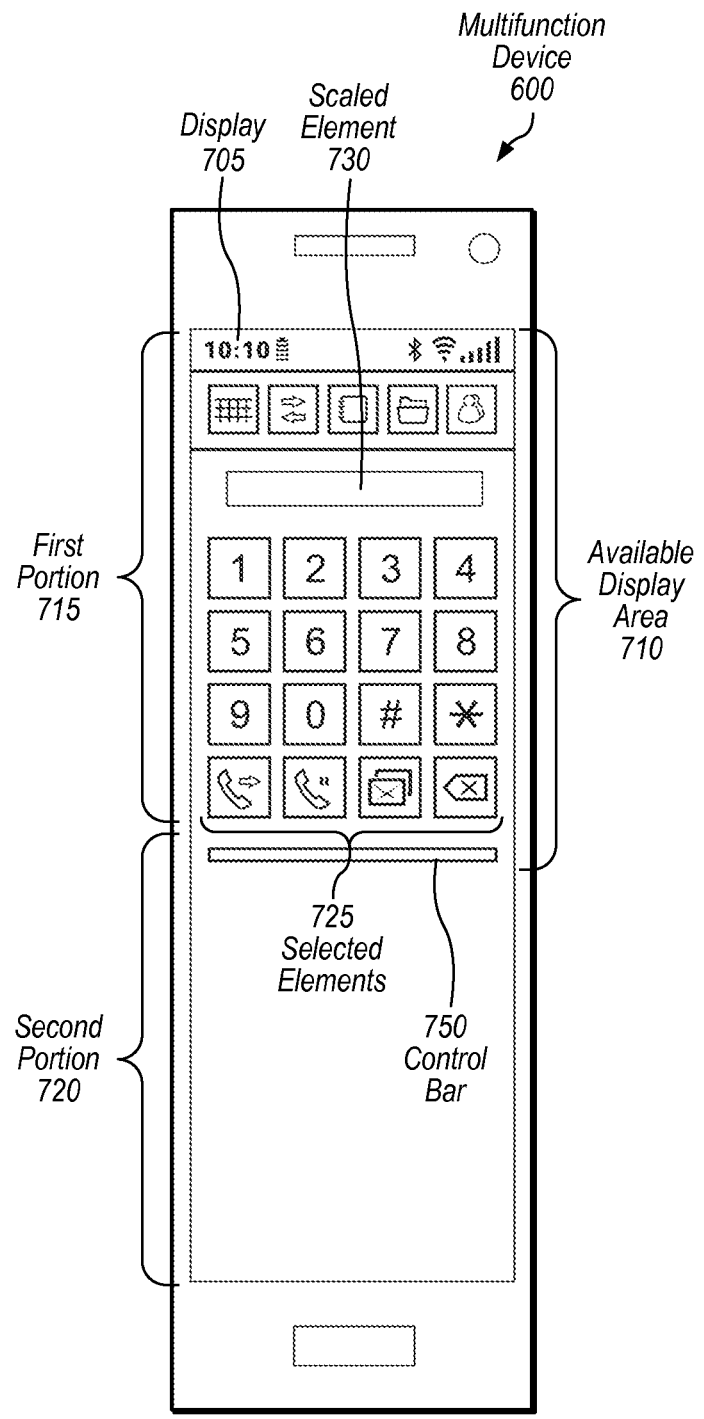
FIG. 7 illustrates a portable multifunction displaying first information in an available display area comprising a first portion of a display screen device in accordance with some embodiments.

FIG. 7 illustrates a portable multifunction displaying first information in an available display area comprising a first portion of a display screen device in accordance with some embodiments. Multifunction device 700 includes a display 705. A first portion 715 is an available display area 710 and a second portion 720 is in a powered-off condition. As shown in FIG. 7, multifunction device 700 is displaying first information in the available display area 710 comprising the first portion 715 of the display screen in a configuration having a plurality of portions, e.g., first portion 715 and second portion 720.

The first portion 715 of the display screen 705 is configured in a powered-on state to perform display functions and receive user input. The second portion 720 is configured in a powered-off state. A display control bar 750 for providing user input is shown. Selected interface elements 725 are shown, as well as a scaled element 730. Selected interface elements 725 are, in some embodiments, a subset of elements of included in a graphical content data structure comprising content for display in the available display area 710, and embodiments select the selected interface elements 725 of the graphical content data structure for display in the available display area 710 based at least in part on whether the second portion 720 is in a powered-on state.

In some embodiments, a size of scaled element 730 is determined by scaling elements of the graphical content data structure for display in the available display area based at least in part on a dimension of the available display area. In some embodiments, a size of scaled element 730 is determined by scaling elements of the graphical content data structure for display in the available display area based at least in part on whether the second portion is in a powered-on state.

In some embodiments, positions of selected elements 825 are determined by adjusting a position relative to a background element of a foreground content element of the graphical content data structure for display in the available display area based at least in part on whether the second portion is in a powered-on state. In some embodiments, Some embodiments select the selected interface elements 725 of the graphical content data structure for display in the available display area 710 based at least in part on a dimension of the available display area.

Figure 8:
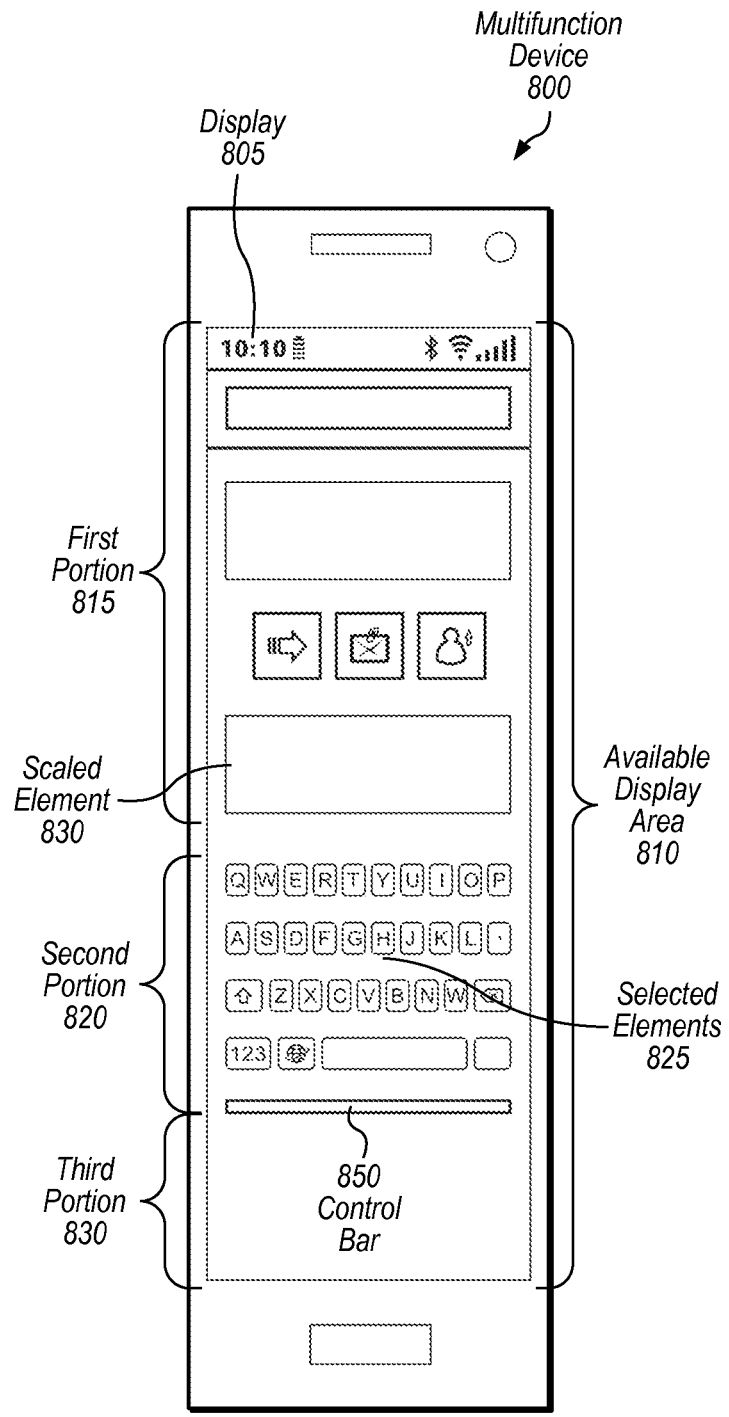
FIG. 8 depicts a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 8 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 800 includes a display 805. A first portion 815 and a second portion 820 are an available display area 810, and a third portion 830 is in a powered-off condition. As shown in FIG. 8, multifunction device 800 is displaying first information in the available display area 810 comprising the first portion 815 of the display screen in a configuration having a plurality of portions, e.g., first portion 815 and second portion 820.

The first portion 815 and the second portion 820 of the display screen 805 are configured in a powered-on state to perform display functions and receive user input. The third portion 830 is configured in a powered-off state. A display control bar 850 for providing user input is shown. Selected interface elements 825 are shown, as well as a scaled element 830. Selected interface elements 825 are, in some embodiments, a subset of elements of included in a graphical content data structure comprising content for display in the available display area 810, and embodiments select the selected interface elements 825 of the graphical content data structure for display in the available display area 810 based at least in part on whether the second portion 820 is in a powered-on state.

In some embodiments, a size of scaled element 830 is determined by scaling elements of the graphical content data structure for display in the available display area based at least in part on a dimension of the available display area. In some embodiments, a size of scaled element 830 is determined by scaling elements of the graphical content data structure for display in the available display area based at least in part on whether the second portion is in a powered-on state.

In some embodiments, positions of selected elements 825 are determined by adjusting a position relative to a background element of a foreground content element of the graphical content data structure for display in the available display area based at least in part on whether the second portion is in a powered-on state. In some embodiments, Some embodiments select the selected interface elements 825 of the graphical content data structure for display in the available display area 810 based at least in part on a dimension of the available display area.

Figure 9:
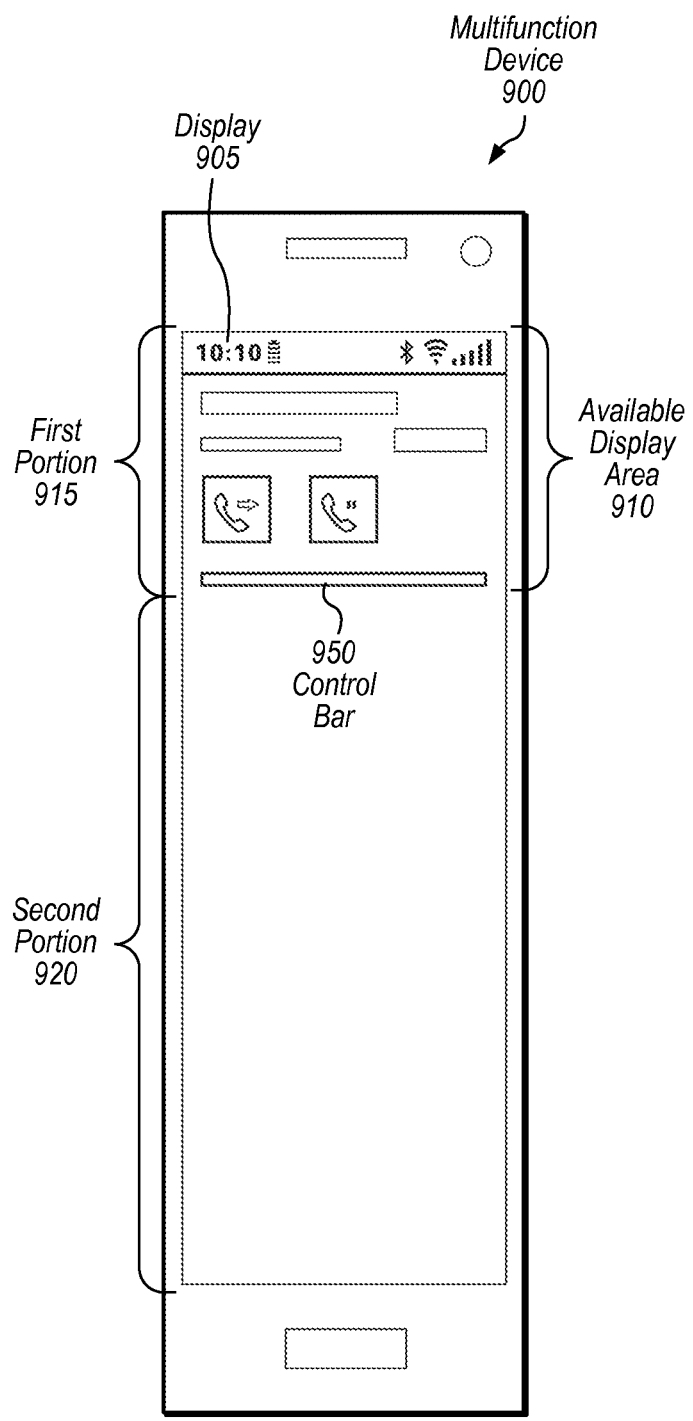
FIG. 9 illustrates a portable multifunction displaying first information in an available display area comprising a first portion of a display screen device in accordance with some embodiments.

FIG. 9 illustrates a portable multifunction displaying first information in an available display area comprising a first portion of a display screen device in accordance with some embodiments. Multifunction device 900 includes a display

905. A first portion 915 is an available display area 910 and a second portion 920 is in a powered-off condition. As shown in FIG. 9, multifunction device 900 is displaying first information in the available display area 910 comprising the first portion 915 of the display screen in a configuration having a plurality of portions, e.g., first portion 915 and second portion 920. The first portion 915 of the display screen 905 is configured in a powered-on state to perform display functions and receive user input. The second portion 920 is configured in a powered-off state. A display control bar 950 for providing user input is shown.

Figure 10:
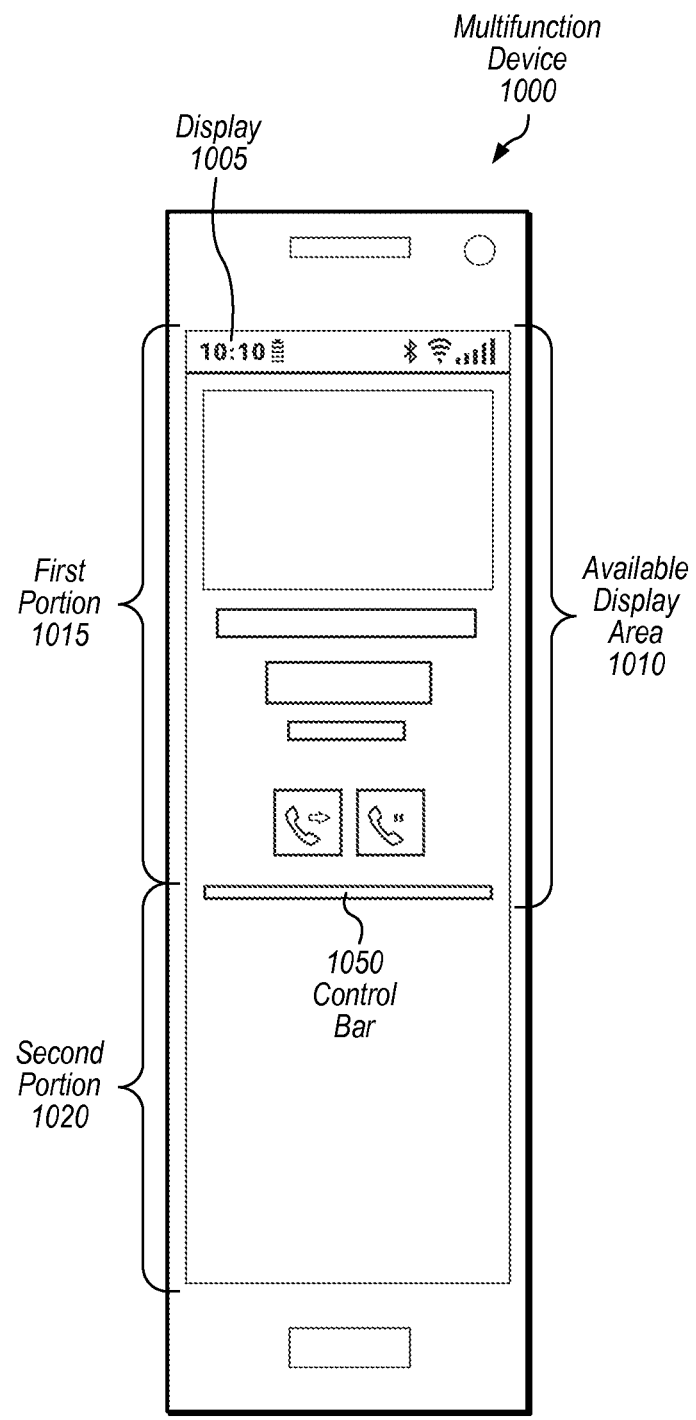
FIG. 10 depicts a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 10 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1000 includes a display 1005. A first portion 1015 is an available display area 1010 and a second portion 1020 is in a powered-off condition. As shown in FIG. 10, multifunction device 1000 is displaying first information in the available display area 1010 comprising the first portion 1015 of the display screen in a configuration having a plurality of portions, e.g., first portion 1015 and second portion 1020. The first portion 1015 of the display screen 1005 is configured in a powered-on state to perform display functions and receive user input. The second portion 1020 is configured in a powered-off state. A display control bar 1050 for providing user input is shown.

Figure 11:
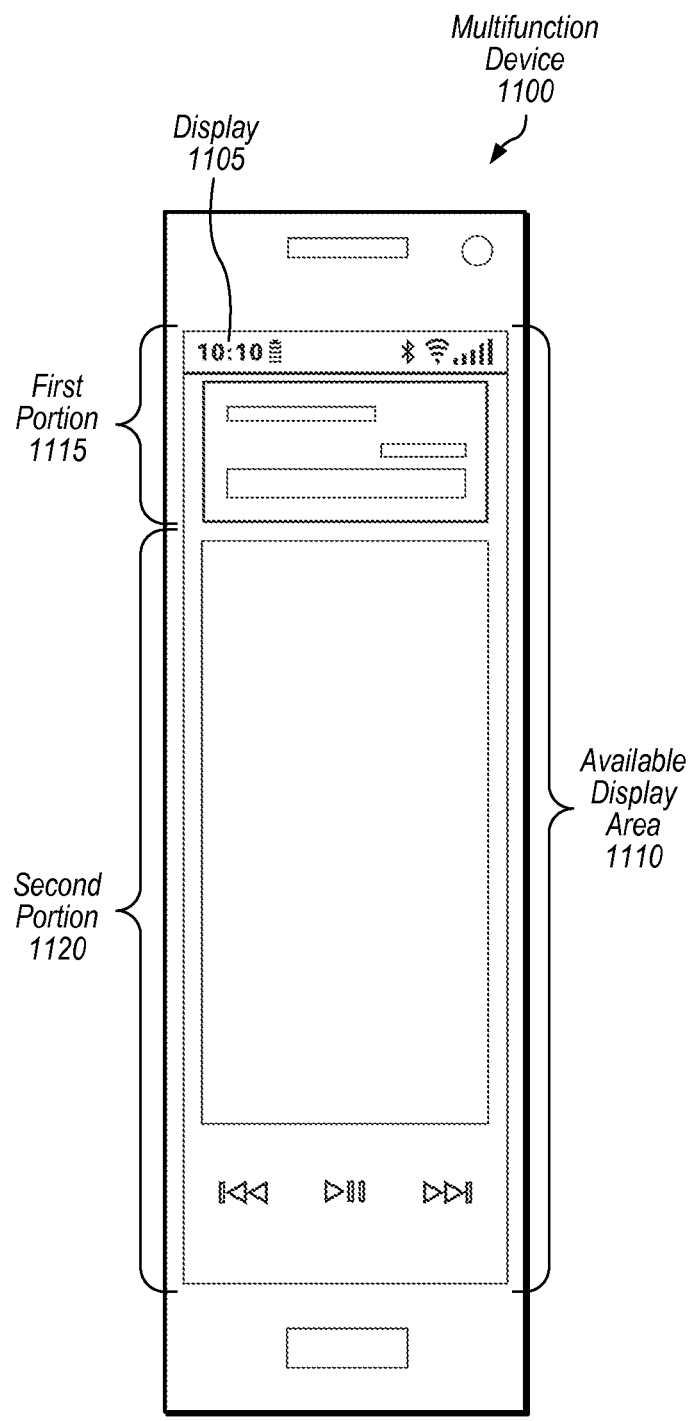
FIG. 11 illustrates a portable multifunction displaying first information in an available display area comprising a first portion of a display screen device in accordance with some embodiments.

FIG. 11 illustrates a portable multifunction displaying first information in an available display area comprising a first portion of a display screen device in accordance with some embodiments. FIG. 11 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1100 includes a display 1105. An available display area 1110 includes a first portion 1115 and a second portion 1120.

Figure 12:
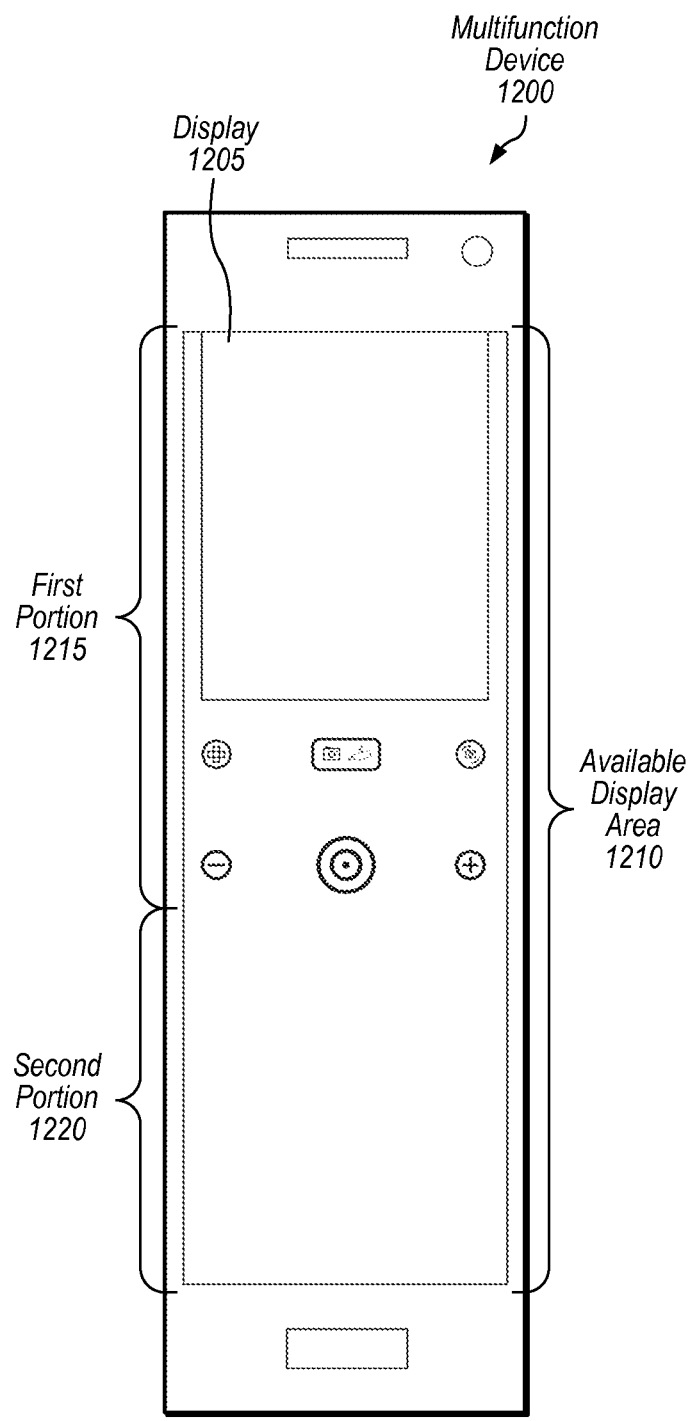
FIG. 12 depicts a portable multifunction displaying first information in an available display area comprising a first portion of a display screen device in accordance with some embodiments.

FIG. 12 depicts a portable multifunction displaying first information in an available display area comprising a first portion of a display screen device in accordance with some embodiments. Multifunction device 1200 includes a display 1205. A first portion 1215 is an available display area 1210 and a second portion 1220 is in a powered-off condition. As shown in FIG. 12, multifunction device 1200 is displaying first information in the available display area 1210 comprising the first portion 1215 of the display screen in a configuration having a plurality of portions, e.g., first portion 1215 and second portion 1220. The first portion 1215 of the display screen 1205 is configured in a powered-on state to perform display functions and receive user input. The second portion 1220 is configured in a powered-off state and may be used as a grip.

Figure 13:
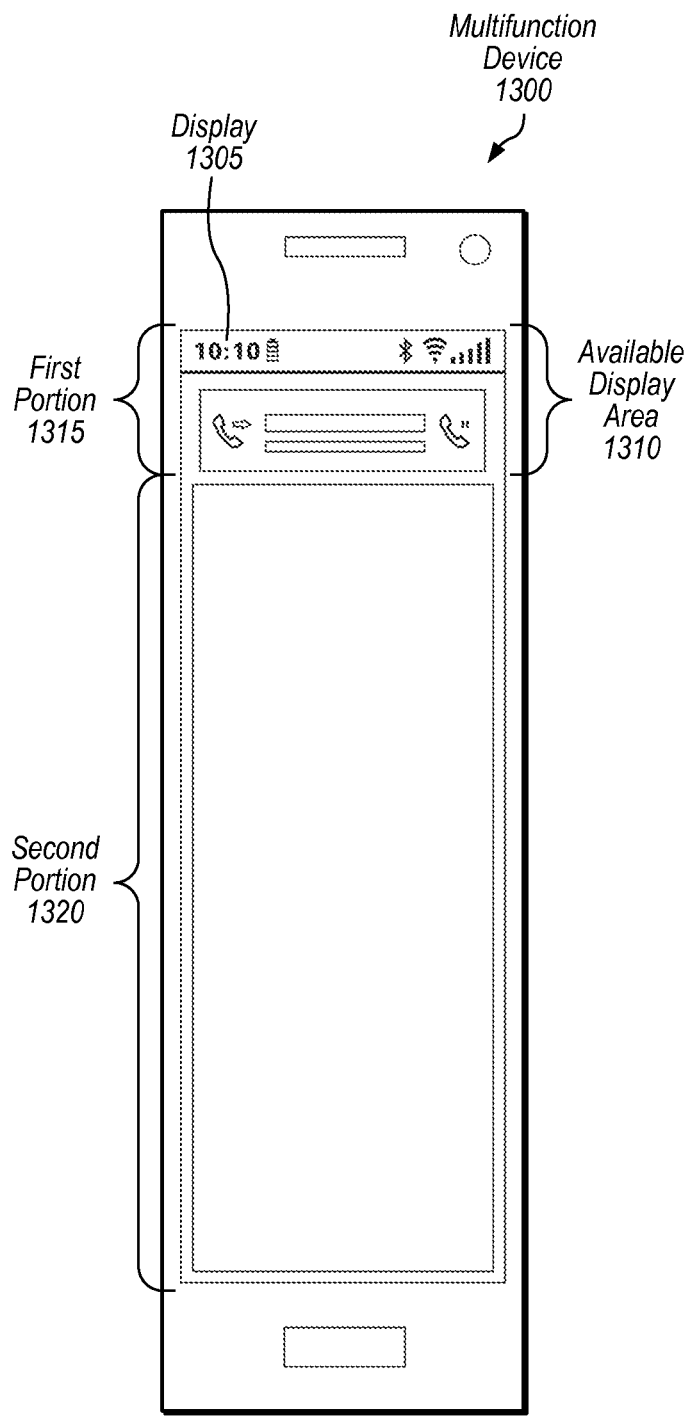
FIG. 13 illustrates a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 13 illustrates a portable multifunction responsive to a user indication in the in the first portion, adding the second portion to the available display area by transitioning the second portion to the powered-on state to perform display functions and receive user input, and displaying second information in the second portion in accordance with some embodiments. FIG. 13 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1300 includes a display 1305. An available display area 1310 includes a first portion 1315 and a second portion 1320.

Figure 14:
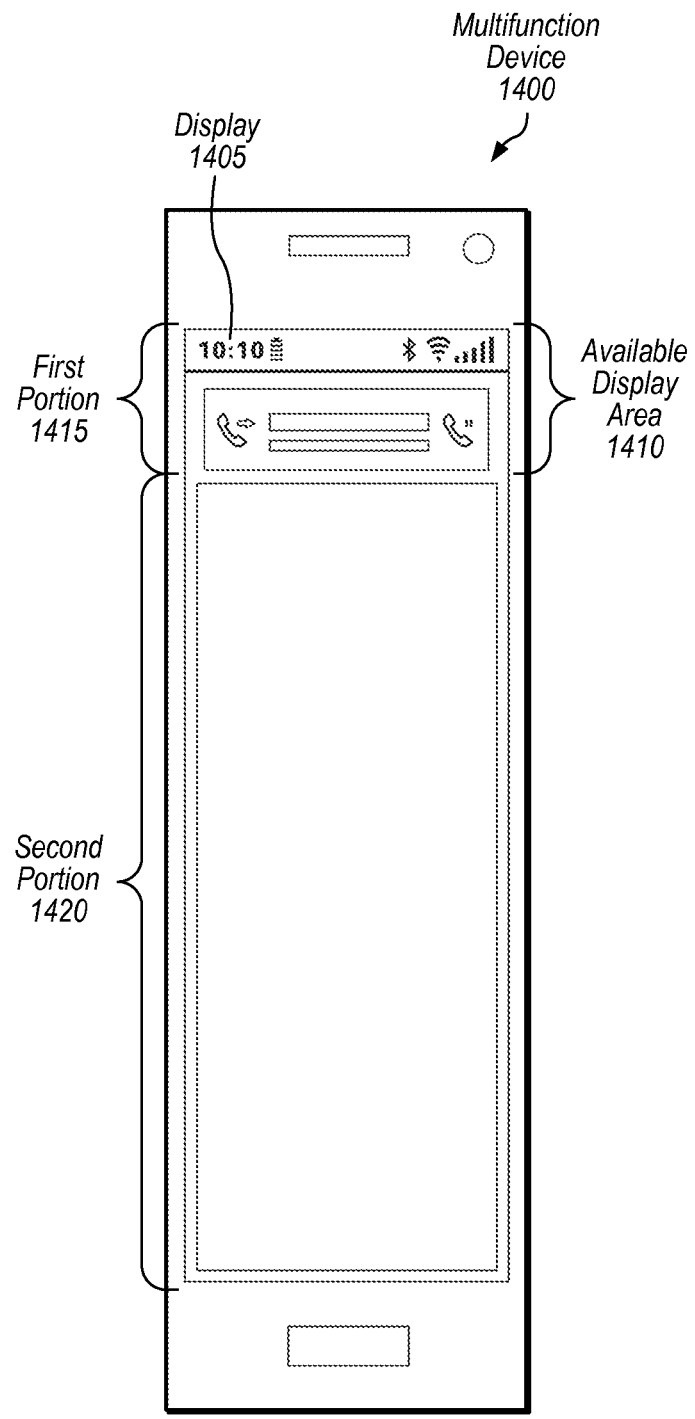
FIG. 14 depicts a portable multifunction displaying with a display screen device in accordance with some embodiments.

FIG. 14 depicts a portable multifunction displaying a display screen device in accordance with some embodiments. FIG. 14 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1400 includes a display 1405. An available display area 1410 includes a first portion 1415 and a second portion 1420.

Figure 15:
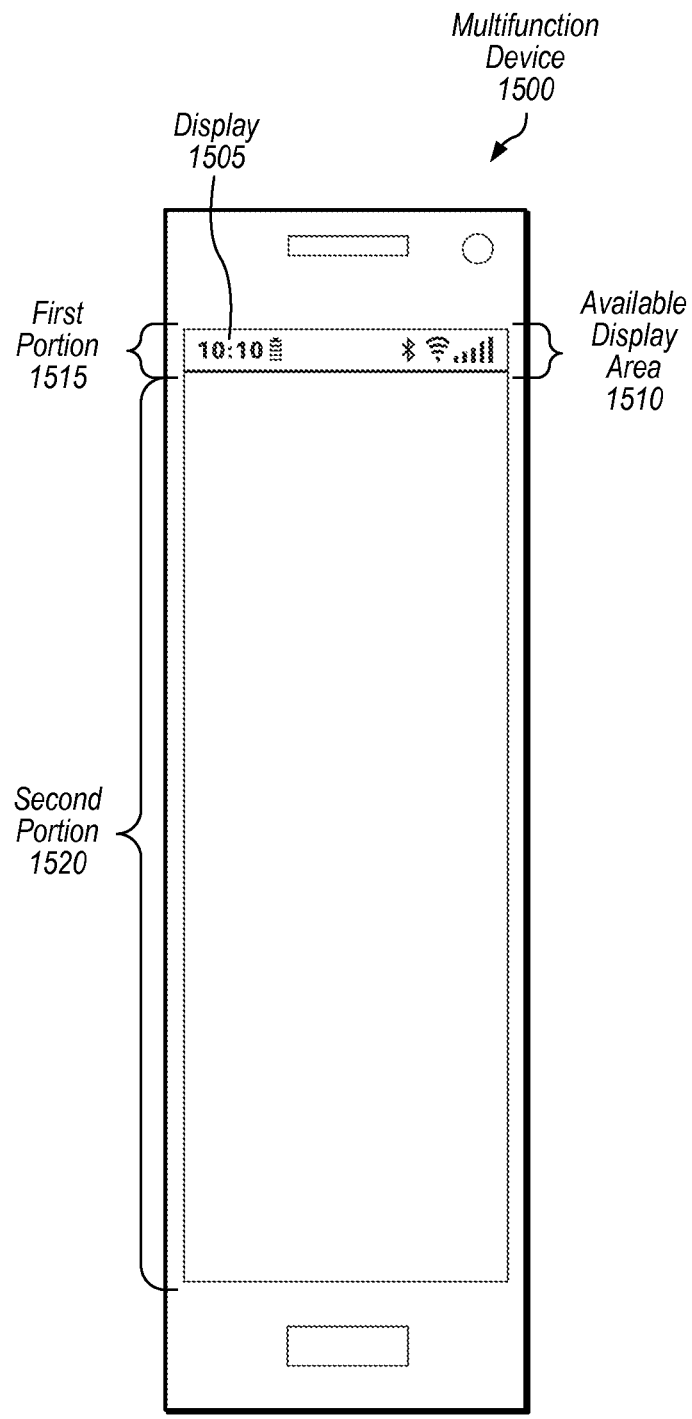
FIG. 15 illustrates a portable multifunction displaying with a display screen device in accordance with some embodiments.

FIG. 15 illustrates a portable multifunction displaying a display screen device in accordance with some embodiments. Multifunction device 1500 includes a display 1505. A first portion 1515 is an available display area 1510 and a second portion 1520 is in a powered-off condition. As shown in FIG. 15, multifunction device 1500 is displaying first information in the available display area 1510 comprising the first portion 1515 of the display screen in a configuration having a plurality of portions, e.g., first portion 1515 and second portion 1520. The first portion 1515 of the display screen 1505 is configured in a powered-on state to perform display functions and receive user input. The second portion 1520 is configured in a powered-off state and may be used as a grip.

Figure 16:
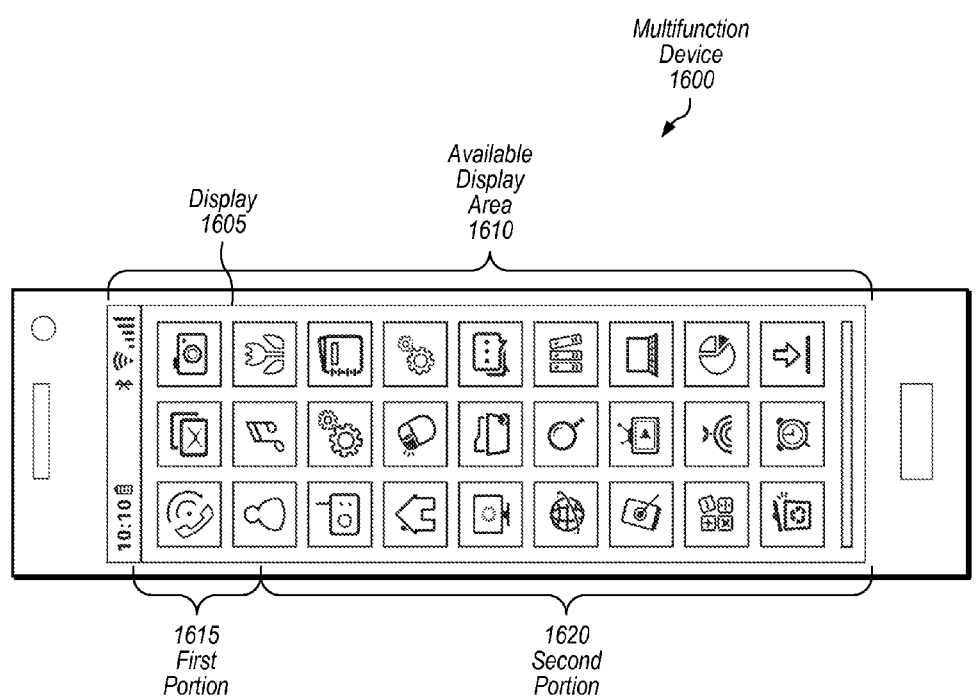
FIG. 16 depicts a portable multifunction displaying first information in an available display area comprising a first portion of a display screen device in accordance with some embodiments.

FIG. 16 depicts a portable multifunction displaying first information in an available display area comprising a first portion of a display screen device in accordance with some embodiments. FIG. 16 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1600 includes a display 1605. An available display area 1610 includes a first portion 1615 and a second portion 1620.

Figure 17:
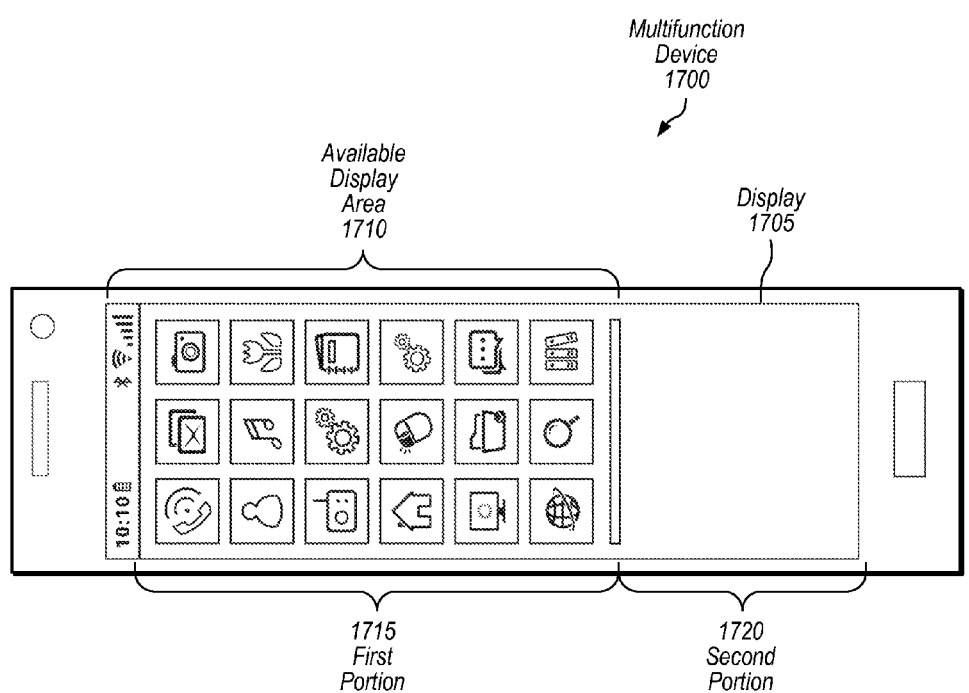
FIG. 17 illustrates a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 17 illustrates a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1700 includes a display 1705. A first portion 1715 is an available display area 1710 and a second portion 1720 is in a powered-off condition. As shown in FIG. 17, multifunction device 1700 is displaying first information in the available display area 1710 comprising the first portion 1715 of the display screen in a configuration having a plurality of portions, e.g., first portion 1715 and second portion 1720. The first portion 1715 of the display screen 1705 is configured in a powered-on state to perform display functions and receive user input. The second portion 1720 is configured in a powered-off state and may be used as a grip.

Figure 18:
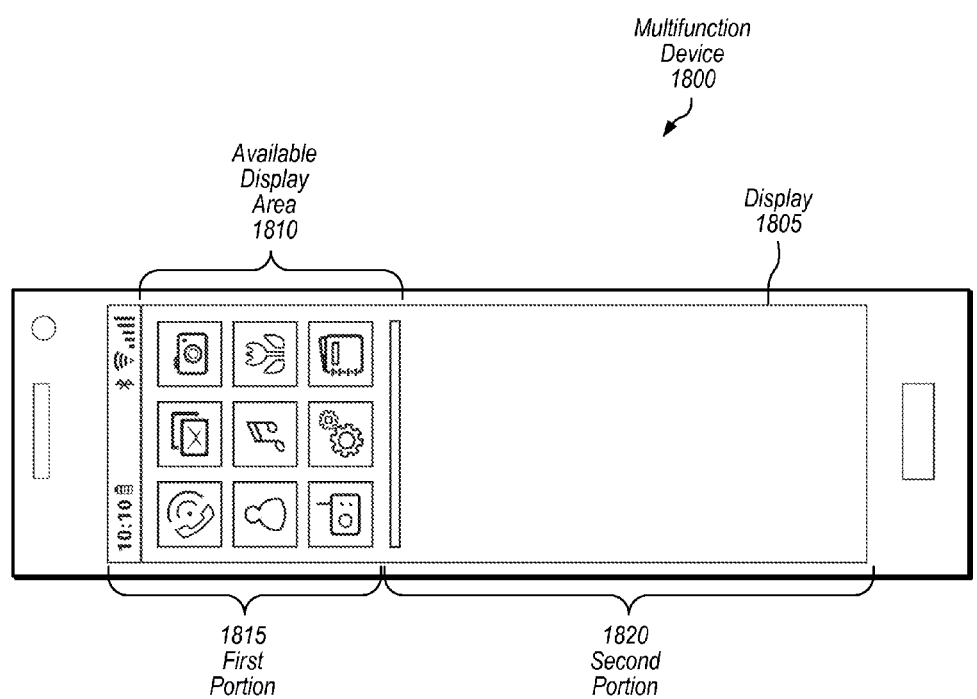
FIG. 18 depicts a portable multifunction responsive to a user indication in the in the first portion, adding the second portion to the available display area by transitioning the second portion to the powered-on state to perform display functions and receive user input, and displaying second information in the second portion in accordance with some embodiments.

FIG. 18 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1800 includes a display 1805. A first portion 1815 is an available display area 1810 and a second portion 1820 is in a powered-off condition. As shown in FIG. 18, multifunction device 1800 is displaying first information in the available display area 1810 comprising the first portion 1815 of the display screen in a configuration having a plurality of portions, e.g., first portion 1815 and second portion 1820. The first portion 1815 of the display screen 1805 is configured in a powered-on state to perform display functions and receive user input. The second portion 1820 is configured in a powered-off state and may be used as a grip.

Figure 19:
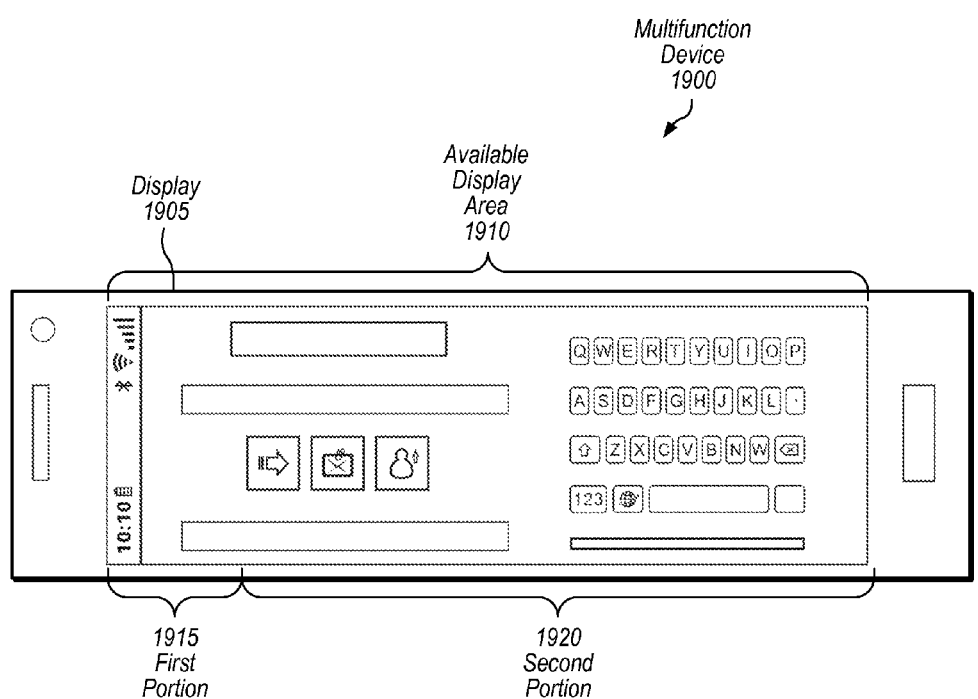
FIG. 19 illustrates a portable multifunction displaying with a display screen device in accordance with some embodiments.

FIG. 19 illustrates a portable multifunction with a display screen device in accordance with some embodiments. FIG. 19 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 1900 includes a display 1905. An available display area 1910 includes a first portion 1915 and a second portion 1920.

Figure 20:
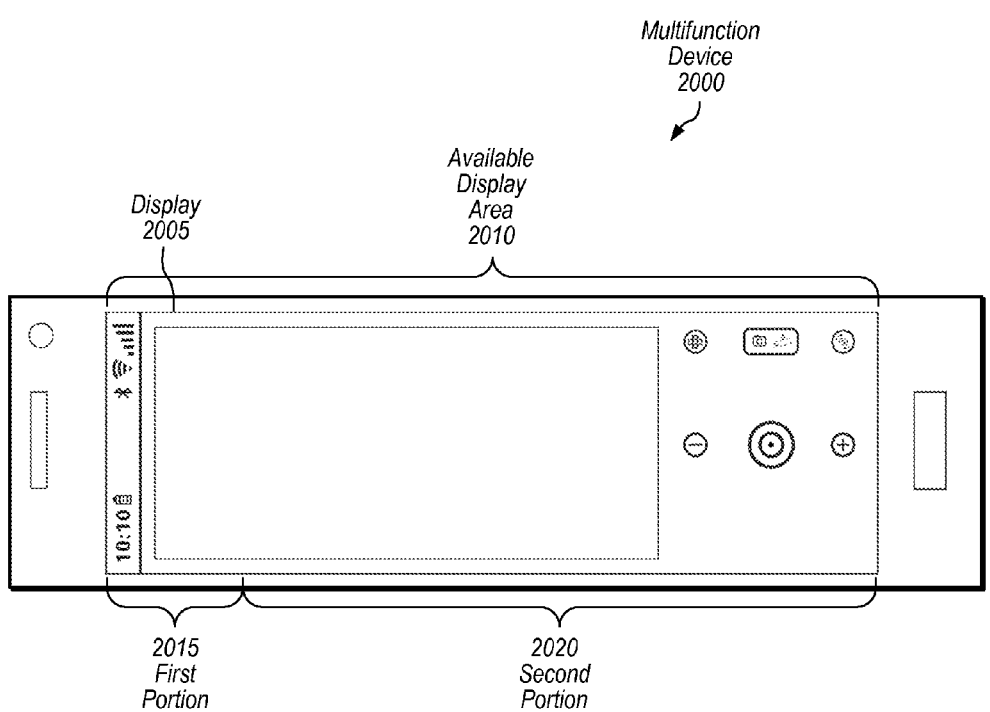
FIG. 20 depicts a portable multifunction displaying with a display screen device in accordance with some embodiments.

FIG. 20 depicts a portable multifunction with a display screen device in accordance with some embodiments. FIG. 20 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 2000 includes a display 2005. An available display area 2010 includes a first portion 2015 and a second portion 2020.

Figure 21:
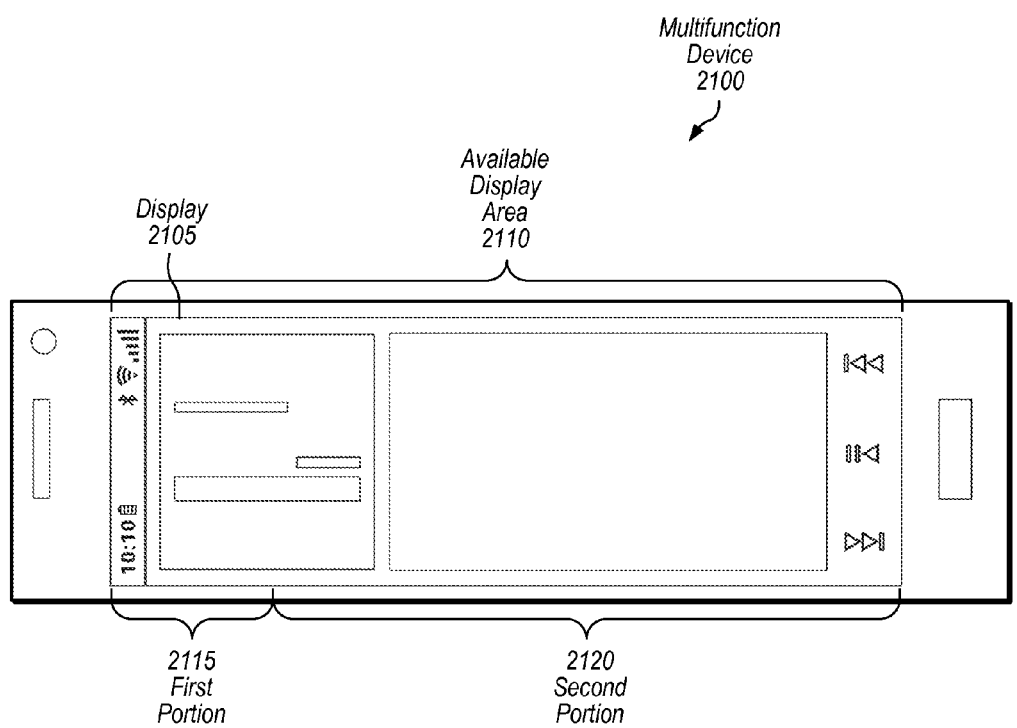
FIG. 21 illustrates a portable multifunction displaying with a display screen device in accordance with some embodiments.

FIG. 21 illustrates a portable multifunction with a display screen device in accordance with some embodiments. FIG. 21 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 2100 includes a display 2105. An available display area 2110 includes a first portion 2115 and a second portion 2120.

Figure 22:
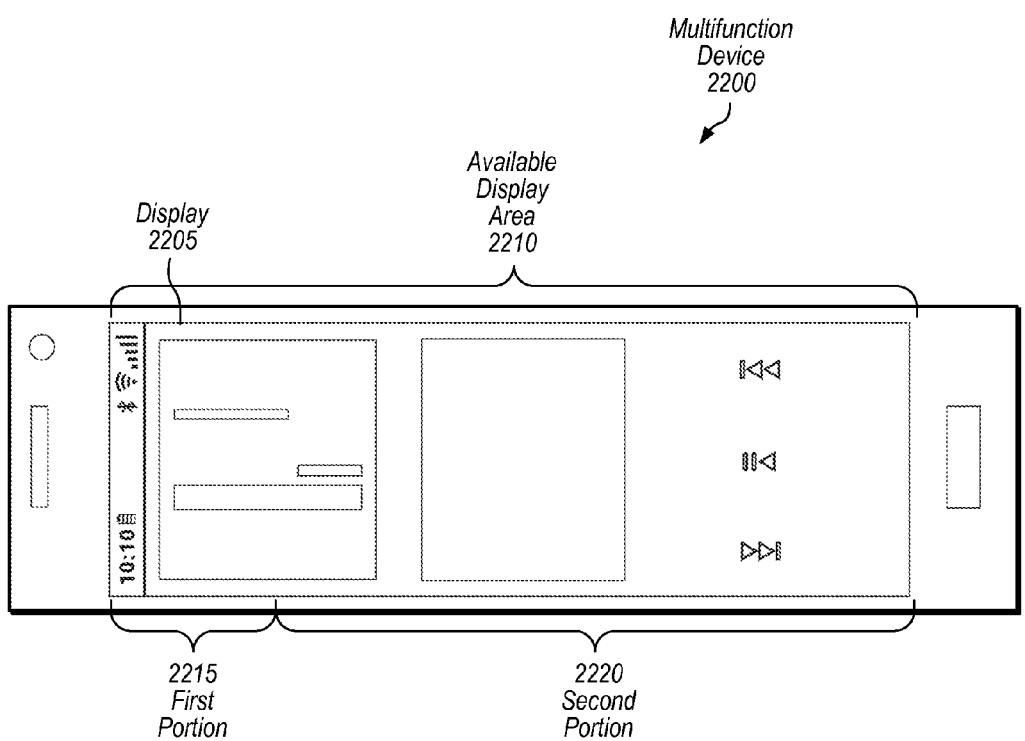
FIG. 22 depicts a portable multifunction displaying with a display screen device in accordance with some embodiments.

FIG. 22 depicts a portable multifunction with a display screen device in accordance with some embodiments. FIG. 22 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 2200 includes a display 2205. An available display area 2210 includes a first portion 2215 and a second portion 2220.

Figure 23:
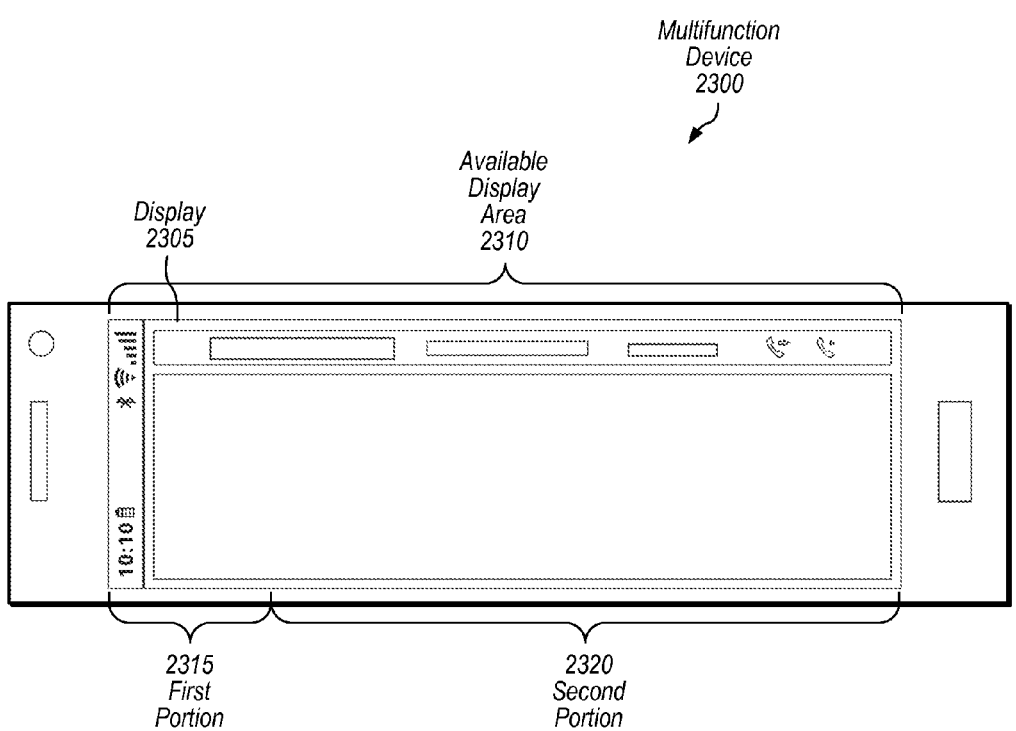
FIG. 23 illustrates a portable multifunction displaying with a display screen device in accordance with some embodiments.

FIG. 23 illustrates a portable multifunction with a display screen device in accordance with some embodiments. FIG. 23 depicts a portable multifunction responsive to a user indication in the in the first portion, adding the second portion to the available display area by transitioning the second portion to the powered-on state to perform display functions and receive user input, and displaying second information in the second portion in accordance with some embodiments. Multifunction device 2300 includes a display 2305. An available display area 2310 includes a first portion 2315 and a second portion 2320.

Figure 24:
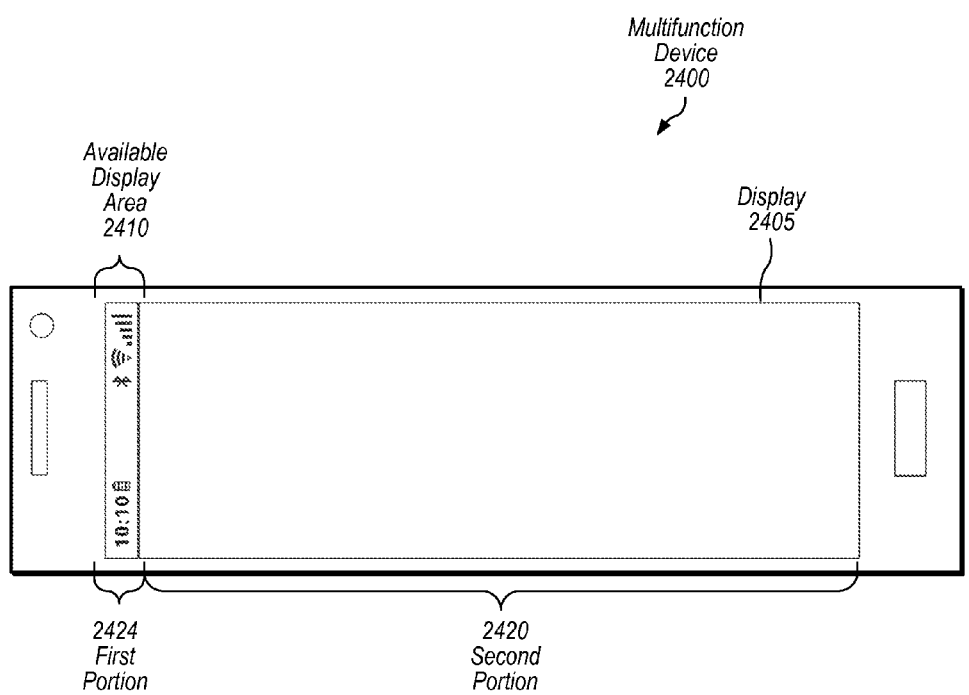
FIG. 24 depicts a portable multifunction displaying with a display screen device in accordance with some embodiments.

FIG. 24 depicts a portable multifunction with a display screen device in accordance with some embodiments. Multifunction device 2400 includes a display 2405. A first portion 2415 is an available display area 2410 and a second portion 2420 is in a powered-off condition. As shown in FIG. 24, multifunction device 2400 is displaying first information in the available display area 2410 comprising the first portion 2415 of the display screen in a configuration having a plurality of portions, e.g., first portion 2415 and second portion 2420. The first portion 2415 of the display screen 2405 is configured in a powered-on state to perform display functions and receive user input. The second portion 2420 is configured in a powered-off state and may be used as a grip.

Screen Power Management Module

Figure 25:
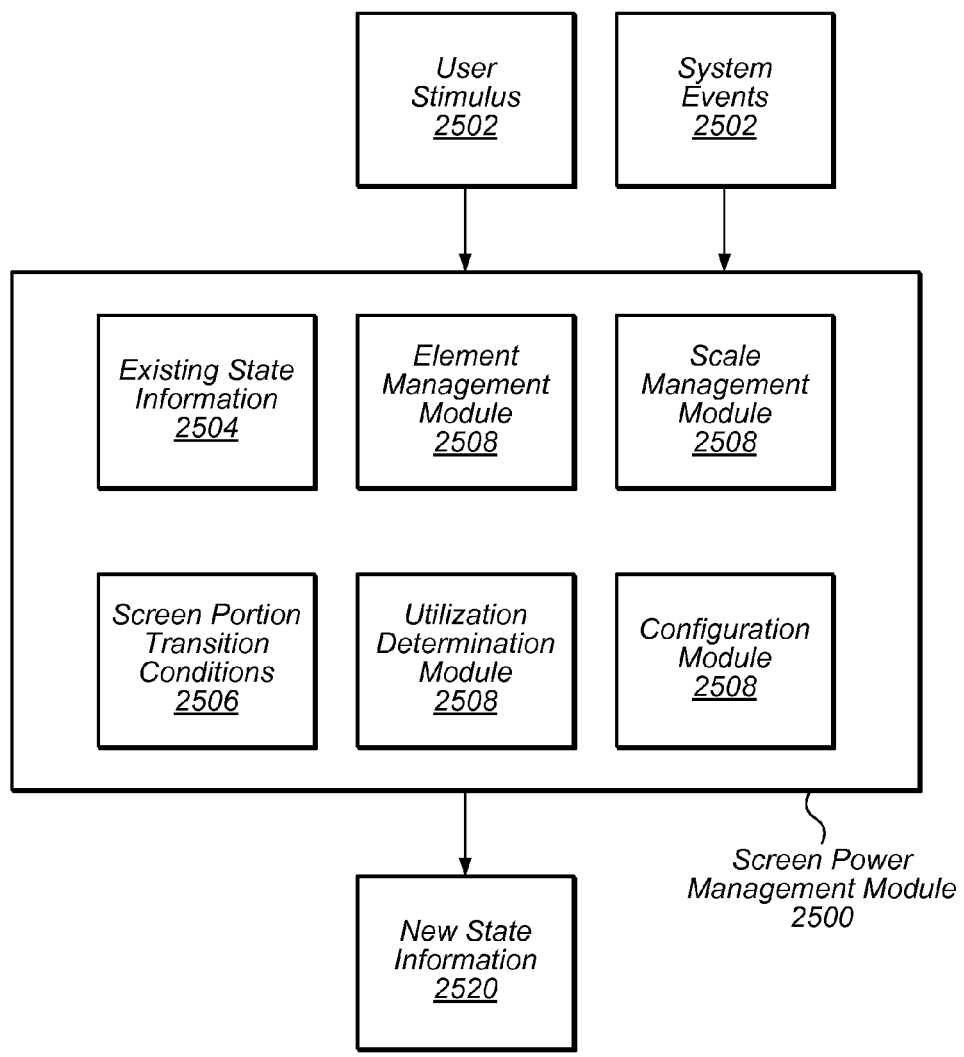
FIG. 25 illustrates a display power management module for managing display power consumption, according to some embodiments.

FIG. 25 illustrates a display power management module for managing display power consumption, according to some embodiments. Display power management module 2500 includes a configuration module 2510, a utilization determination module 2520, an element management module 2530, and a scale management module 2540. Screen power management module 2500 receives as input system events 2550 and user stimulus 2560, stores existing state information 2570 and screen portion transition conditions 2580, and generates as output new state information 2520.

In some embodiments, configuration module 2510 allocates display screen space to a first portion of the display screen, which is configured in a powered-on state to perform display functions and receive user input, and a second portion of the display screen, which is configured in a powered-off state. In such a state, a graphics module, such as graphics module 132 of FIG. 1, performs displaying first information in an available display area comprising a first portion of a display screen in a configuration having a plurality of portions, as described above. Responsive to a user indication in the in the first portion, which is received by screen power management module as a user stimulus 2560, utilization determination module 2520 may perform adding the second portion to the available display area by, in conjunction with configuration module 2510, transitioning the second portion to the powered-on state to perform display functions and receive user input. Configuration module 2510 may reverse the configuration of the display, and a portion of the display screen may be removed from the powered-on state to the powered off state in response to user input. Likewise, the actions described herein as being performed in response to user input may, in some embodiments, be performed in response to system events 2550 such as the passage of an amount of time or a signal from an application or system module, or other system events 2550, such as a power-down or sleep signal.

In some embodiments, utilization determination module 2520 performs adding the second portion to the available display area by, in conjunction with configuration module 2510, transitioning the second portion to the powered-on state to perform display functions and receive user input in response to system events 2560, such as stimulus provided by an application or a module of the multifunction device. In either case, a graphics module, such as graphics module 132 of FIG. 1, may then perform displaying second information in the second portion. States of the first and second portion are stored in existing state information 2570. New state information 2520 includes instructions to a graphics module, such as graphics module 132 of FIG. 1, for implementing transitioning the second portion to the powered-on state to perform display functions and receive user input.

In some embodiments, scale management module 2540 performs generating the second information by mathematically upscaling the first information. The second information includes a portion of the first information upscaled for display in both the second portion and the first portion. In some such embodiments, a graphics module, such as graphics module 132 of FIG. 1, performs displaying third information in the first portion. The third information comprises a portion of the first information upscaled for display in both the second portion and the first portion.

In some embodiments, system events 2550 include graphical content data structures. Screen power management module 2500 performs receiving a graphical content data structure including content for display in the available display area. Element management module 2530 performs selecting elements of the graphical content data structure for display in the available display area based at least in part on whether the second portion is in a powered-on state.

In some embodiments, system events 2550 include graphical content data structures. Screen power management module 2500 performs receiving a graphical content data structure including content for display in the available display area. Scale management module 2540 performs scaling elements of the graphical content data structure for display in the available display area based at least in part on a dimension of the available display area.

In some embodiments, system events 2550 include graphical content data structures. Screen power management module 2500 performs receiving a graphical content data structure including content for display in the available display area. Scale management module 2540 performs scaling elements of the graphical content data structure for display in the available display area based at least in part on whether the second portion is in a powered-on state.

In some embodiments, system events 2550 include graphical content data structures. Screen power management module 2500 performs receiving a graphical content data structure including content for display in the available display area. Element management module 2530 performs adjusting a position relative to a background element of a foreground content element of the graphical content data structure for display in the available display area based at least in part on whether the second portion is in a powered-on state.

In some embodiments, system events 2550 include graphical content data structures. Screen power management module 2500 performs receiving a graphical content data structure including content for display in the available display area. Element management module 2530 performs selecting elements of the graphical content data structure for display in the available display area based at least in part on a dimension of the available display area.

Example Operations

Figure 26:
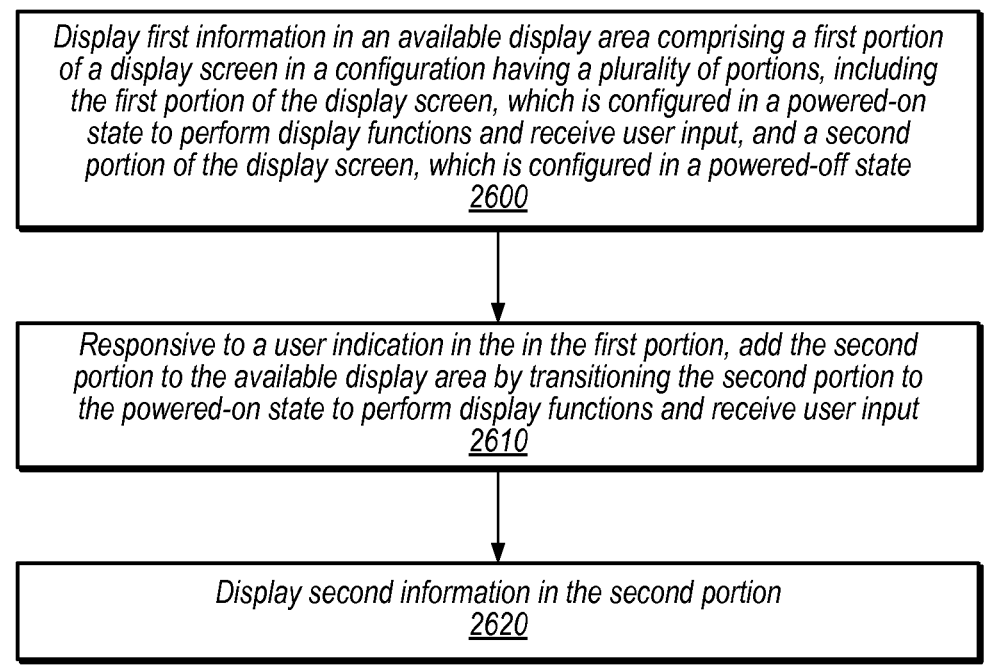
FIG. 26 is a flow diagram illustrating one embodiment of a method for managing display power consumption, according to some embodiments.

FIG. 26 is a flow diagram illustrating one embodiment of a method for managing display power consumption, according to some embodiments. First information is displayed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 2600). Responsive to a user indication in the in the first portion, the second portion is added to the available display area by transitioning the second portion to the powered-on state to perform display functions and receive user input (block 2610). Second information is displayed in the second portion (block 2620).

The process is reversible, and a portion of the display screen may be removed from the powered-on state to the powered off state in response to user input. Likewise, the actions described herein as being performed in response to user input may, in some embodiments, be performed in response to system events such as the passage of an amount of time or a signal from an application or system module, or other system events, such as a power-down or sleep signal.

Figure 27:
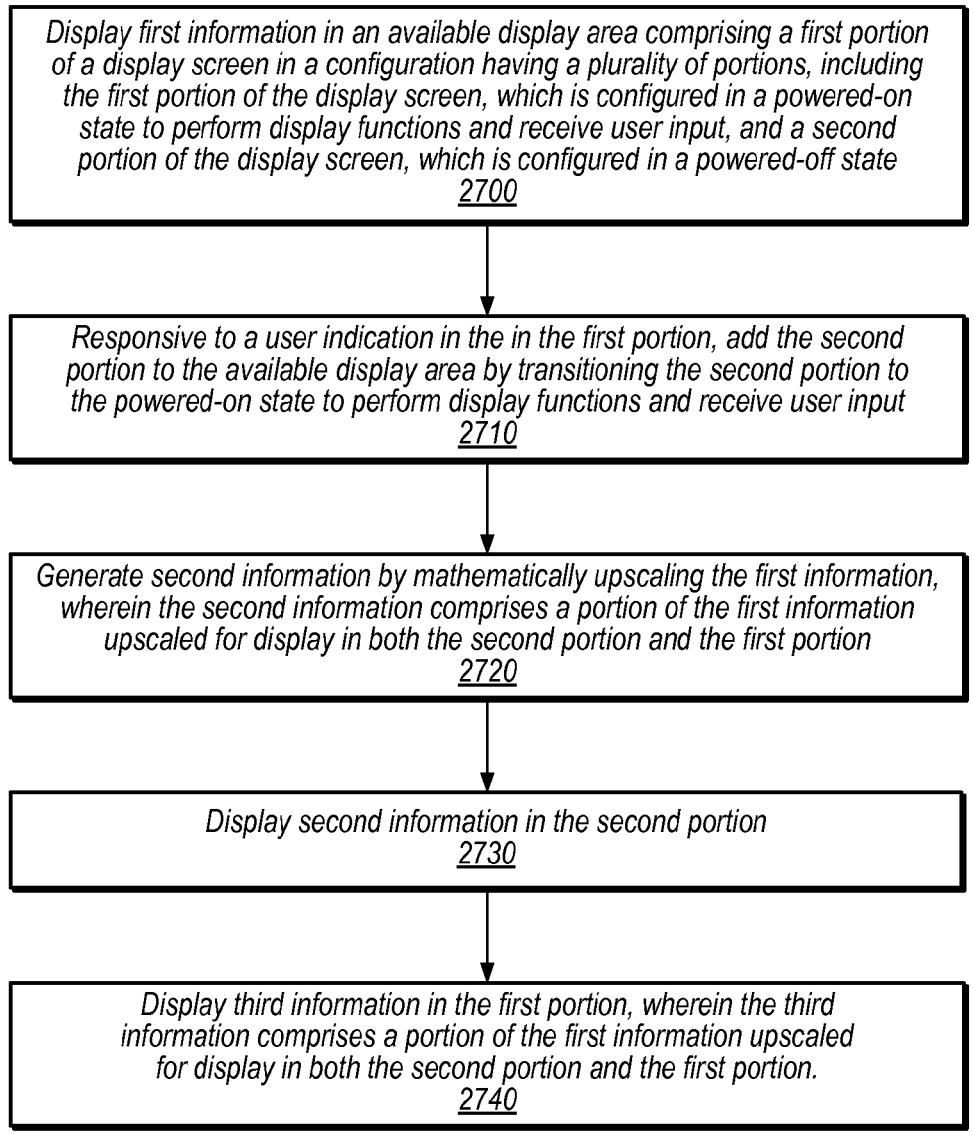
FIG. 27 is a flow diagram illustrating one embodiment of a method for managing display power consumption, according to some embodiments.

FIG. 27 is a flow diagram illustrating one embodiment of a method for managing display power consumption, according to some embodiments. First information is displayed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 2700). Responsive to a user indication in the in the first portion, the second portion is added to the available display area by transitioning the second portion to the powered-on state to perform display functions and receive user input (block 2710). Second information is generated by mathematically upscaling the first information. The second information includes a portion of the first information upscaled for display in both the second portion and the first portion (block 2720). The second information is displayed in the second portion (block 2730). Third information is displayed in the first portion. The third information comprises a portion of the first information upscaled for display in both the second portion and the first portion. (block 2740).

Figure 28:
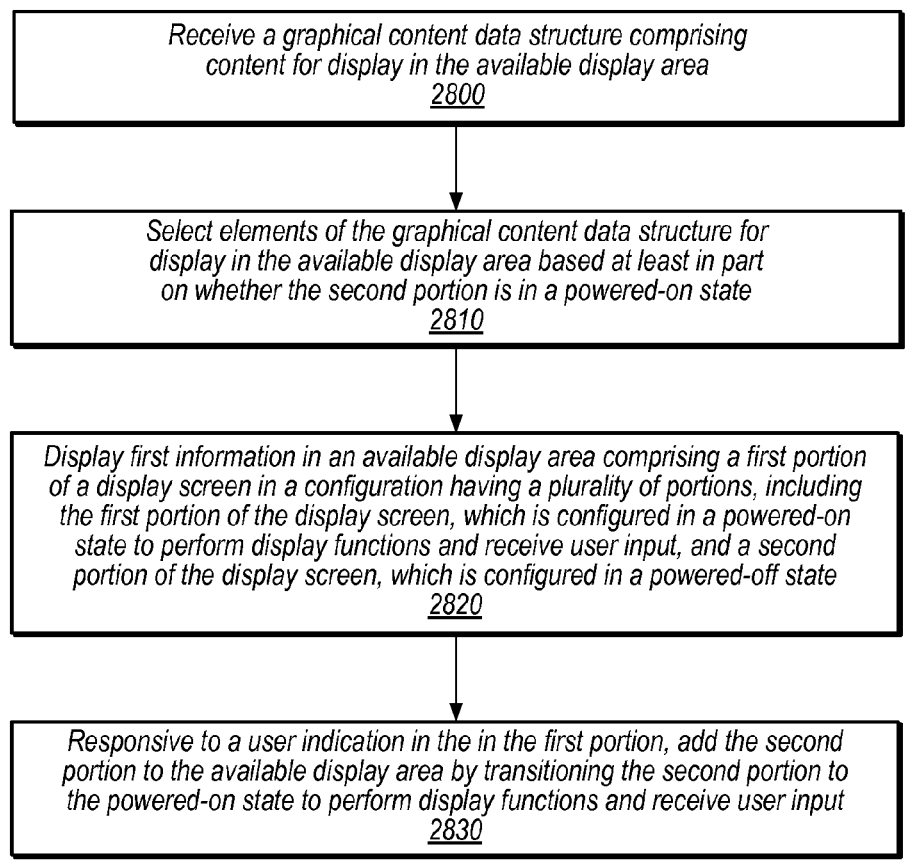
FIG. 28 is a flow diagram illustrating one embodiment of a method for managing display power consumption, according to some embodiments.

FIG. 28 is a flow diagram illustrating one embodiment of a method for managing display power consumption, according to some embodiments. A graphical content data structure including content for display in the available display area is received (block 2800). Elements of the graphical content data structure are selected for display in the available display area based at least in part on whether the second portion is in a powered-on state (block 2810). First information is displayed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 2820). Responsive to a user indication in the in the first portion, the second portion is added to the available display area by transitioning the second portion to the powered-on state to perform display functions and receive user input (block 2830).

Figure 29:
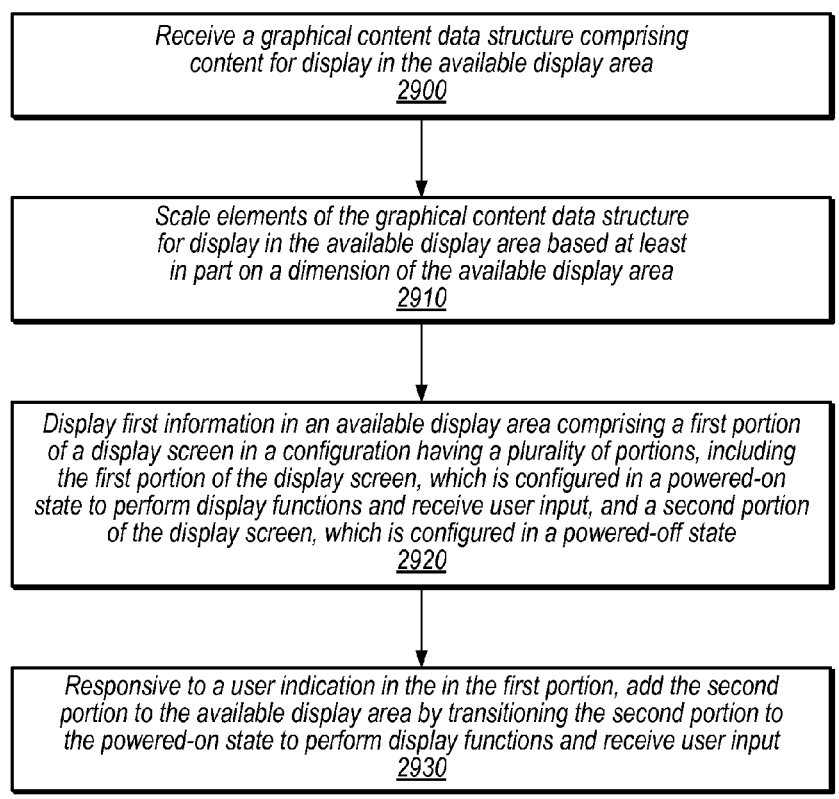
FIG. 29 is a flow diagram illustrating one embodiment of a method for managing display power consumption, according to some embodiments.

FIG. 29 is a flow diagram illustrating one embodiment of a method for managing display power consumption, according to some embodiments. A graphical content data structure comprising content for display in the available display area is received (block 2900). Elements of the graphical content data structure are scaled for display in the available display area based at least in part on a dimension of the available display area (block 2910). First information is displayed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 2920). Responsive to a user indication in the in the first portion, the second portion is added to the available display area by transitioning the second portion to the powered-on state to perform display functions and receive user input (block 2930).

Figure 30:
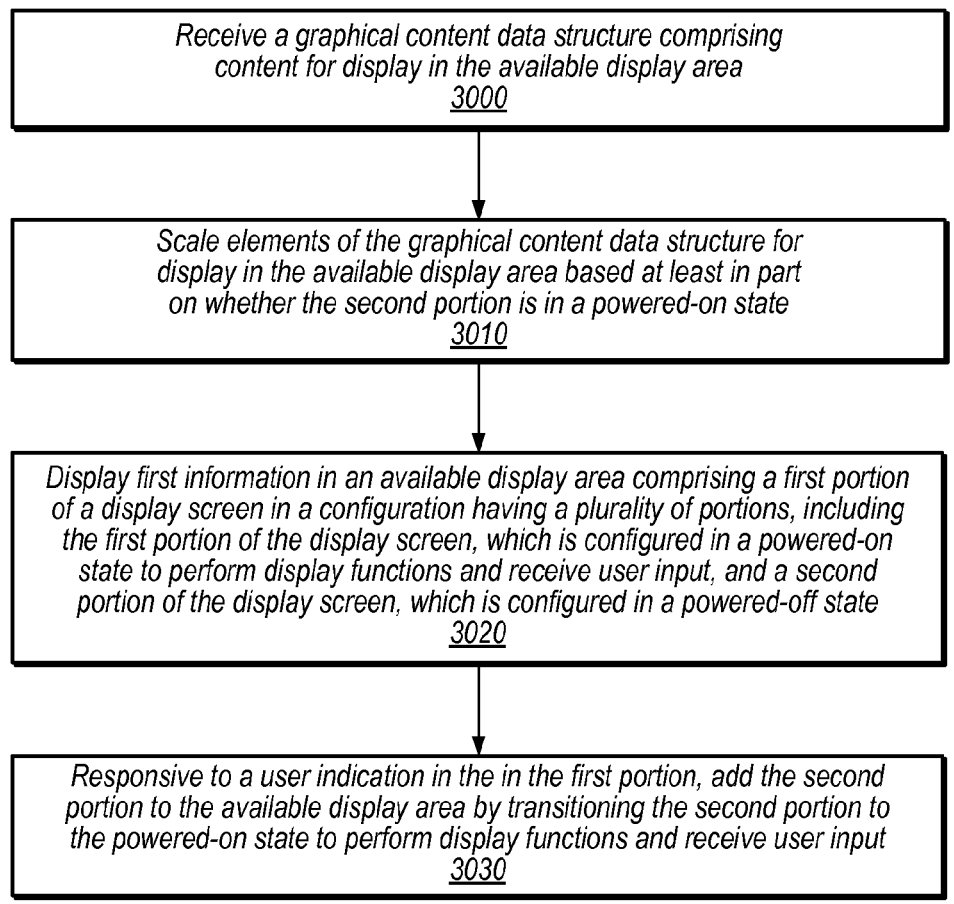
FIG. 30 is a flow diagram illustrating one embodiment of a method for managing display power consumption, according to some embodiments.

FIG. 30 is a flow diagram illustrating one embodiment of a method for managing display power consumption, according to some embodiments. A graphical content data structure comprising content for display in the available display area is received (block 3000). Elements of the graphical content data structure are scaled for display in the available display area based at least in part on whether the second portion is in a powered-on state (block 3010). First information is displayed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 3020). Responsive to a user indication in the first portion, the second portion is added to the available display area by transitioning the second portion to the powered-on state to perform display functions and receive user input (block 3030).

Figure 31:
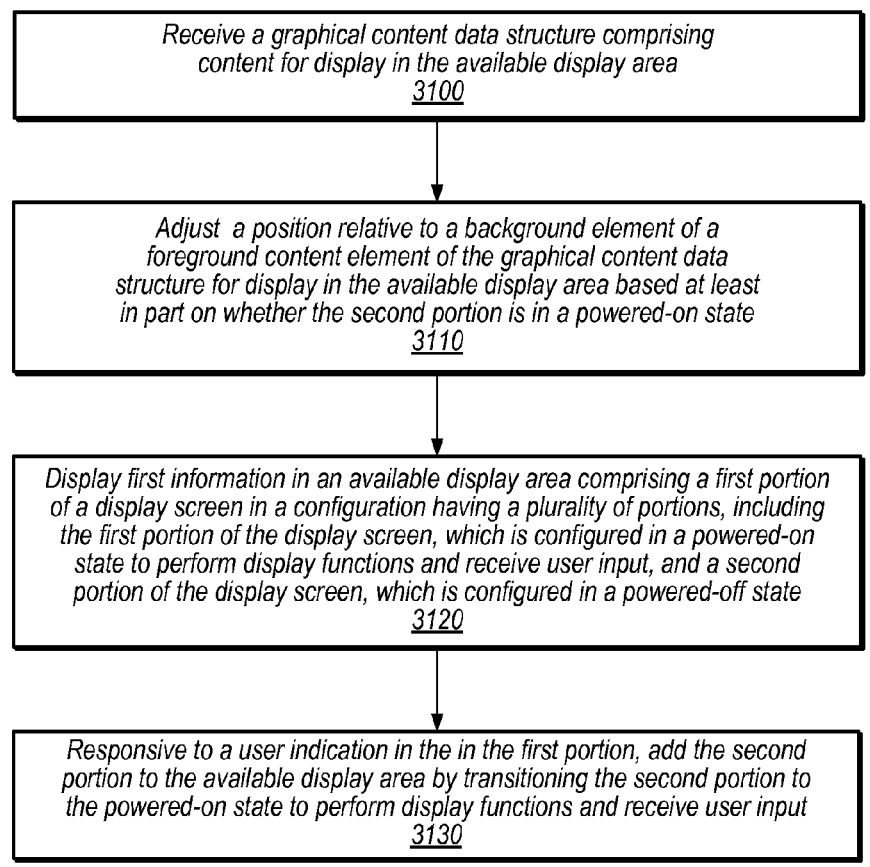
FIG. 31 is a flow diagram illustrating one embodiment of a method for managing display power consumption, according to some embodiments.

FIG. 31 is a flow diagram illustrating one embodiment of a method for managing display power consumption, according to some embodiments. A graphical content data structure comprising content for display in the available display area is received (block 3100). A position relative to a background element of a foreground content element of the graphical content data structure is adjusted for display in the available display area based at least in part on whether the second portion is in a powered-on state (block 3110). First information is displayed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 3120). (block 3130).

Figure 32:
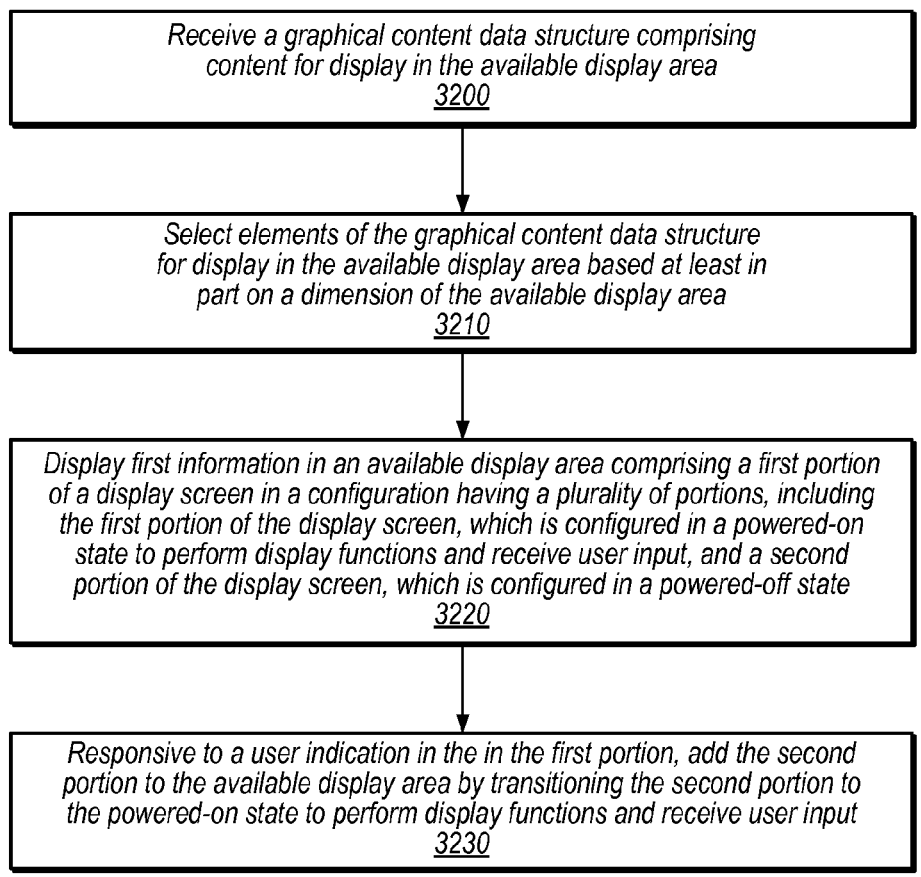
FIG. 32 is a flow diagram illustrating one embodiment of a method for managing display power consumption, according to some embodiments.

FIG. 32 is a flow diagram illustrating one embodiment of a method for managing display power consumption, according to some embodiments. A graphical content data structure comprising content for display in the available display area is received (block 3200). Elements of the graphical content data structure are selected for display in the available display area based at least in part on a dimension of the available display area (block 3210). First information is displatyed in an available display area comprising a first portion of a display screen in a configuration having a plurality of portions, including the first portion of the display screen, which is configured in a powered-on state to perform display functions and receive user input, and a second portion of the display screen, which is configured in a powered-off state (block 3220). Responsive to a user indication in the in the first portion, the second portion is added to the available display area by transitioning the second portion to the powered-on state to perform display functions and receive user input (block 3230).

Example Computer System

Figure 33:
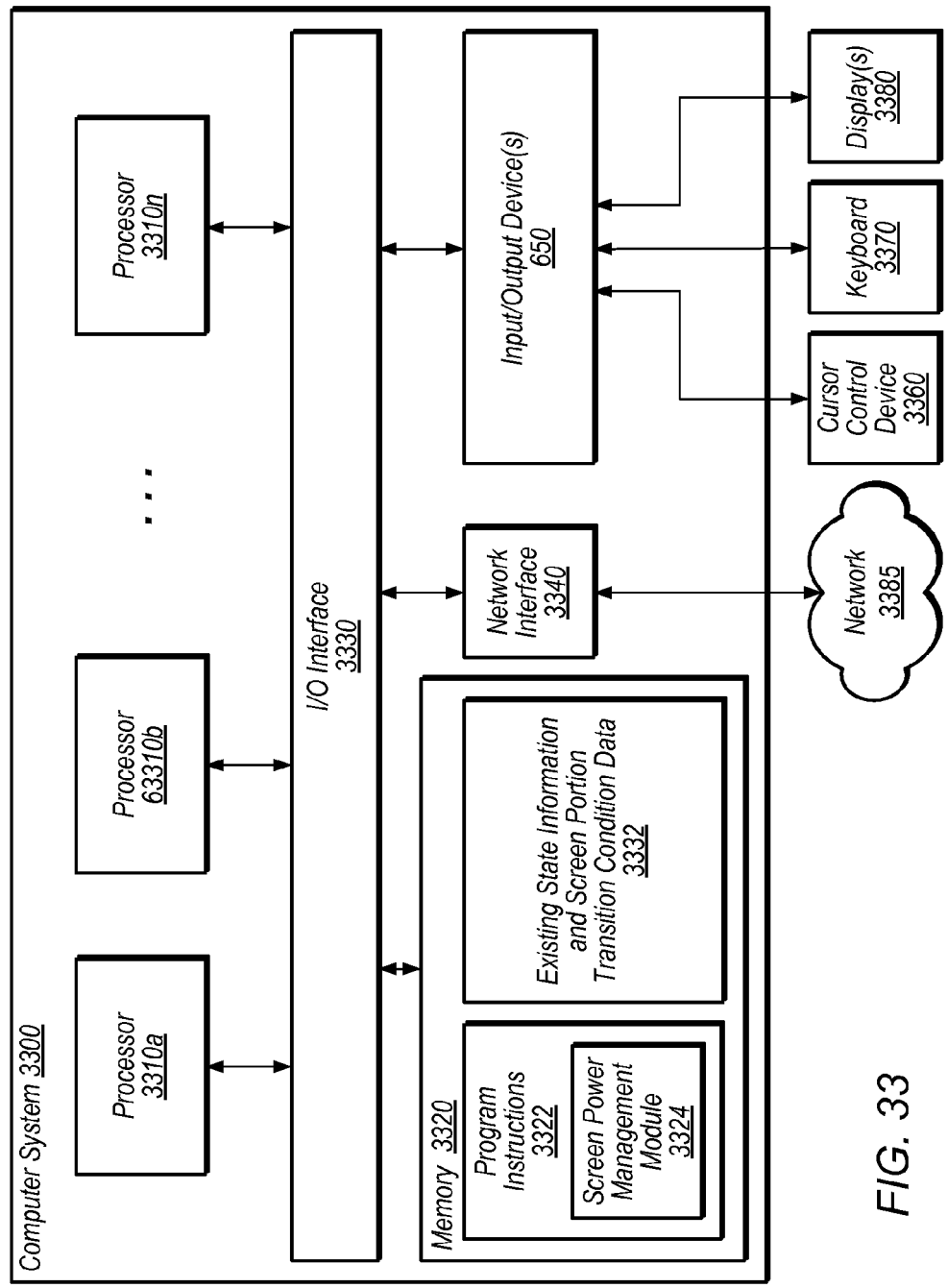
FIG. 33 illustrates an example computer system configured to implement aspects of the system and method for managing display power consumption.

FIG. 33 illustrates computer system 3300 that is configured to execute any or all of the embodiments described above. In different embodiments, computer system 3300 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 3300, which may interact with various other devices. Note that any component, action, or functionality described above with respect to FIGS. 1-5 may be implemented on one or more computers configured as computer system 3300 of FIG. 33, according to various embodiments. In the illustrated embodiment, computer system 3300 includes one or more processors 3310 coupled to a system memory 3320 via an input/output (I/O) interface 3330. Computer system 3300 further includes a network interface 3340 coupled to I/O interface 3330, and one or more input/output devices 3350, such as cursor control device 3360, keyboard 3370, and display(s) 3380. In some cases, it is contemplated that embodiments may be implemented using a single instance of computer system 3300, while in other embodiments multiple such systems, or multiple nodes making up computer system 3300, may be configured to host different portions or instances of embodiments. For example, in one embodiment some elements may be implemented via one or more nodes of computer system 3300 that are distinct from those nodes implementing other elements.

In various embodiments, computer system 3300 may be a uniprocessor system including one processor 3310, or a multiprocessor system including several processors 3310 (e.g., two, four, eight, or another suitable number). Processors 3310 may be any suitable processor capable of executing instructions. For example, in various embodiments processors 3310 may be general-purpose or embedded processors implementing any of a variety of instruction set architectures (ISAs), such as the x86, PowerPC, SPARC, or MIPS ISAs, or any other suitable ISA. In multiprocessor systems, each of processors 3310 may commonly, but not necessarily, implement the same ISA.

System memory 3320 may be configured to store program instructions 3322 and/or existing state information and ownership transition condition data 3332 accessible by processor 3310. In various embodiments, system memory 3320 may be implemented using any suitable memory technology, such as static random access memory (SRAM), synchronous dynamic RAM (SDRAM), nonvolatile/Flash-type memory, or any other type of memory. In the illustrated embodiment, program instructions 3322 may be configured to implement a mapping application 3324 incorporating any of the functionality described above. Additionally, existing state information and ownership transition condition data 3332 of memory 3320 may include any of the information or data structures described above. In some embodiments, program instructions and/or data may be received, sent or stored upon different types of computer-accessible media or on similar media separate from system memory 3320 or computer system 3300. While computer system 3300 is described as implementing the functionality of functional blocks of previous Figures, any of the functionality described herein may be implemented via such a computer system.

In one embodiment, I/O interface 3330 may be configured to coordinate I/O traffic between processor 3310, system memory 3320, and any peripheral devices in the device, including network interface 3340 or other peripheral interfaces, such as input/output devices 3350. In some embodiments, I/O interface 3330 may perform any necessary protocol, timing or other data transformations to convert data signals from one component (e.g., system memory 3320) into a format suitable for use by another component (e.g., processor 3310). In some embodiments, I/O interface 3330 may include support for devices attached through various types of peripheral buses, such as a variant of the Peripheral Component Interconnect (PCI) bus standard or the Universal Serial Bus (USB) standard, for example. In some embodiments, the function of I/O interface 3330 may be split into two or more separate components, such as a north bridge and a south bridge, for example. Also, in some embodiments some or all of the functionality of I/O interface 3330, such as an interface to system memory 3320, may be incorporated directly into processor 3310.

Network interface 3340 may be configured to allow data to be exchanged between computer system 3300 and other devices attached to a network 3385 (e.g., carrier or agent devices) or between nodes of computer system 3300. Network 3385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3350 may, in some embodiments, include one or more display terminals, keyboards, keypads, touchpads, scanning devices, voice or optical recognition devices, or any other devices suitable for entering or accessing data by one or more computer systems 3300. Multiple input/output devices 3350 may be present in computer system 3300 or may be distributed on various nodes of computer system 3300. In some embodiments, similar input/output devices may be separate from computer system 3300 and may interact with one or more nodes of computer system 3300 through a wired or wireless connection, such as over network interface 3340.

As shown in FIG. 33, memory 3320 may include program instructions 3322, which may be processor-executable to implement any element or action described above. In one embodiment, the program instructions may implement the methods described above, such as the methods illustrated by FIG. 8. In other embodiments, different elements and data may be included. Note that data 3332 may include any data or information described above.

Those skilled in the art will appreciate that computer system 3300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 3300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3300 may be transmitted to computer system 3300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method, comprising
displaying first information in an available display area comprising a first portion of a display screen and associated sensors in a configuration having a plurality of portions, comprising
the first portion of the display screen and associated sensors, which is configured in a powered-on state to perform display functions and receive user input, and
a second portion of the display screen and associated sensors, which is configured in a powered-off state and incapable of receiving user input;
responsive to a user indication in the in the first portion, adding the second portion to the available display area by transitioning the second portion to the powered-on state to perform display functions and receive user input;
displaying second information in the second portion;
generating the second information by mathematically upscaling the first information, wherein the second information comprises a portion of the first information upscaled for display in both the second portion and the first portion; and displaying third information in the first portion, wherein the third information comprises a portion of the first information upscaled for display in both the second portion and the first portion.

2. The method of claim 1, further comprising:
receiving a graphical content data structure comprising content for display in the available display area; and
selecting elements of the graphical content data structure for display in the available display area based at least in part on whether the second portion is in a powered-on state.

3. The method of claim 1, further comprising:
receiving a graphical content data structure comprising content for display in the available display area; and
scaling elements of the graphical content data structure for display in the available display area based at least in part on a dimension of the available display area.

4. The method of claim 1, further comprising:
receiving a graphical content data structure comprising content for display in the available display area; and
scaling elements of the graphical content data structure for display in the available display area based at least in part on whether the second portion is in a powered-on state.

5. The method of claim 1, further comprising:
receiving a graphical content data structure comprising content for display in the available display area; and
adjusting a position relative to a background element of a foreground content element of the graphical content data structure for display in the available display area based at least in part on whether the second portion is in a powered-on state.

6. The method of claim 1, further comprising:
receiving a graphical content data structure comprising content for display in the available display area; and
selecting elements of the graphical content data structure for display in the available display area based at least in part on a dimension of the available display area.

7. A multifunction device, comprising:
one or more processors;
a display screen and associated sensors; and
one or more memories storing program instructions executable on the one or more processors to perform:
displaying first information in an available display area comprising a first portion of the display screen in a configuration having a plurality of portions, comprising
the first portion of the display screen and associated sensors, which is configured in a powered-on state to perform display functions and receive user input, and
a second portion of the display screen and associated sensors, which is configured in a powered-off state and incapable of receiving user input;
responsive to a user indication in the in the first portion, adding the second portion to the available display area by transitioning the second portion to the powered-on state to perform display functions and receive user input;
displaying second information in the second portion;
program instructions executable on the one or more processors to perform generating the second information by mathematically upscaling the first information, wherein the second information comprises a portion of the first information upscaled for display in both the second portion and the first portion; and
program instructions executable on the one or more processors to perform displaying third information in the first portion, wherein
the third information comprises a portion of the first information upscaled for display in both the second portion and the first portion.

8. The multifunction device of claim 7, further comprising:
program instructions executable on the one or more processors to perform receiving a graphical content data structure comprising content for display in the available display area; and
program instructions executable on the one or more processors to perform selecting elements of the graphical content data structure for display in the available display area based at least in part on whether the second portion is in a powered-on state.

9. The multifunction device of claim 7, further comprising:
program instructions executable on the one or more processors to perform receiving a graphical content data structure comprising content for display in the available display area; and
program instructions executable on the one or more processors to perform scaling elements of the graphical content data structure for display in the available display area based at least in part on a dimension of the available display area.

10. The multifunction device of claim 7, further comprising:
program instructions executable on the one or more processors to perform receiving a graphical content data structure comprising content for display in the available display area; and
program instructions executable on the one or more processors to perform scaling elements of the graphical content data structure for display in the available display area based at least in part on whether the second portion is in a powered-on state.

11. The multifunction device of claim 7, further comprising:
program instructions executable on the one or more processors to perform receiving a graphical content data structure comprising content for display in the available display area; and
program instructions executable on the one or more processors to perform adjusting a position relative to a background element of a foreground content element of the graphical content data structure for display in the available display area based at least in part on whether the second portion is in a powered-on state.

12. The multifunction device of claim 7, further comprising:
program instructions executable on the one or more processors to perform receiving a graphical content data structure comprising content for display in the available display area; and
program instructions executable on the one or more processors to perform selecting elements of the graphical content data structure for display in the available display area based at least in part on a dimension of the available display area.

13. A non-transitory, computer-readable storage medium, storing program instructions executable on a computer to implement:
displaying first information in an available display area comprising a first portion of a display screen and associated sensors in a configuration having a plurality of portions, comprising the first portion of the display screen and associated sensors, which is configured in a powered-on state to perform display functions and receive user input, and a second portion of the display screen and associated sensors, which is configured in a powered-off state and incapable of receiving user input;

responsive to a user indication in the in the first portion, adding the second portion to the available display area by transitioning the second portion to the powered on state to perform display functions and receive user input; displaying second information in the second portion;

program instructions executable on a computer to implement generating the second information by mathematically upscaling the first information, wherein the second information comprises a portion of the first information upscaled for display in both the second portion and the first portion; and program instructions executable on a computer to implement displaying third information in the first portion, wherein the third information comprises a portion of the first information upscaled for display in both the second portion and the first portion.

14. The non-transitory, computer-readable storage medium of claim 13, further comprising:

program instructions executable on a computer to implement receiving a graphical content data structure comprising content for display in the available display area; and program instructions executable on a computer to implement selecting elements of the graphical content data structure for display in the available display area based at least in part on whether the second portion is in a powered-on state.

15. The non-transitory, computer-readable storage medium of claim 13, further comprising:

program instructions executable on a computer to implement receiving a graphical content data structure comprising content for display in the available display area; and program instructions executable on a computer to implement scaling elements of the graphical content data structure for display in the available display area based at least in part on a dimension of the available display area.

16. The non-transitory, computer-readable storage medium of claim 13, further comprising:

program instructions executable on a computer to implement receiving a graphical content data structure comprising content for display in the available display area; and program instructions executable on a computer to implement scaling elements of the graphical content data structure for display in the available display area based at least in part on whether the second portion is in a powered-on state.

17. The non-transitory, computer-readable storage medium of claim 13, further comprising:

program instructions executable on a computer to implement receiving a graphical content data structure comprising content for display in the available display area; and program instructions executable on a computer to implement adjusting a position relative to a background element of a foreground content element of the graphical content data structure for display in the available display area based at least in part on whether the second portion is in a powered-on state.

* * * * *